US008108790B2

(12) United States Patent
Morrison, Jr. et al.

(10) Patent No.: US 8,108,790 B2
(45) Date of Patent: Jan. 31, 2012

(54) APPARATUS AND METHOD FOR VISUALIZATION OF CONTROL TECHNIQUES IN A PROCESS CONTROL SYSTEM

(75) Inventors: Donald A. Morrison, Jr., Centerville, OH (US); Pravin W. Shende, Karnataka (IN); Chandrakanth Vittal, Karnataka (IN); Gobinath Pandurangan, Karnataka (IN)

(73) Assignee: Honeywell International Inc., Morristown, NJ (US)

(*) Notice: Subject to any disclaimer, the term of this patent is extended or adjusted under 35 U.S.C. 154(b) by 1100 days.

(21) Appl. No.: 11/944,693

(22) Filed: Nov. 26, 2007

(65) Prior Publication Data
US 2008/0244449 A1    Oct. 2, 2008

Related U.S. Application Data

(60) Provisional application No. 60/920,084, filed on Mar. 26, 2007.

(51) Int. Cl.
*G06F 3/048* (2006.01)
*G06F 19/00* (2011.01)
*G05B 15/00* (2006.01)

(52) U.S. Cl. .......... 715/771; 715/965; 715/792; 700/83; 700/108

(58) Field of Classification Search .................. 715/965, 715/771, 792; 700/83, 108
See application file for complete search history.

(56) References Cited

U.S. PATENT DOCUMENTS

| 6,289,299 | B1 | 9/2001 | Daniel, Jr. et al. |
| 6,629,003 | B1 | 9/2003 | Frizzell et al. |
| 6,901,560 | B1* | 5/2005 | Guerlain et al. ............. 715/833 |
| 6,952,808 | B1 | 10/2005 | Jamieson et al. |
| 7,835,805 | B2* | 11/2010 | Hood et al. .................... 700/20 |
| 2006/0069474 | A1 | 3/2006 | Dietsch et al. |
| 2007/0132779 | A1* | 6/2007 | Gilbert et al. ................ 345/619 |
| 2007/0168065 | A1* | 7/2007 | Nixon et al. .................... 700/97 |
| 2008/0066004 | A1* | 3/2008 | Blevins et al. ............... 715/771 |
| 2008/0082308 | A1* | 4/2008 | Kant et al. ..................... 703/12 |

FOREIGN PATENT DOCUMENTS

EP    0592921 A1    4/1994

OTHER PUBLICATIONS

Microsoft Computer Dictionary, May 1, 2002, Microsoft Press, Fifth Edition.*
AIS Automation Dresden GMBH, Fab Wide e-Diagnostics—solution for your equipment [Online] Apr. 2004, URL:http://www.ais-automation.com/rdat_en.html.
Smartline Inc., Reference Guide—Remote Task manager [Online] 2004, URL:http://www.devicelock.com/rtm/download.html.
Presseninformation VOM Jun. 28, 2004, Remote Task manager fur intelligente Systemsteuerung [Online] Jun. 2004, URL:http://www.SmartLine.talkabout.de.

* cited by examiner

*Primary Examiner* — Tadeese Hailu
*Assistant Examiner* — Nicholas Ulrich

(57) ABSTRACT

Various graphical displays used for visualization of control techniques in a process control system can be provided to an operator. For example, a graphical display could include (i) an image associated with at least a portion of a process and (ii) one or more icons identifying one or more process variables associated with at least the portion of the process. Selection of an icon could present the operator with a faceplate containing information associated with at least one of the process variables. Another graphical display could include (i) a focal variable symbol identifying a focal process variable and (ii) one or more additional variable symbols identifying one or more additional process variables associated with the focal process variable. Gains associated with the additional process variables could be identified in the display. Yet another graphical display could be used to remotely invoke and control applications executing in a process control system.

22 Claims, 15 Drawing Sheets

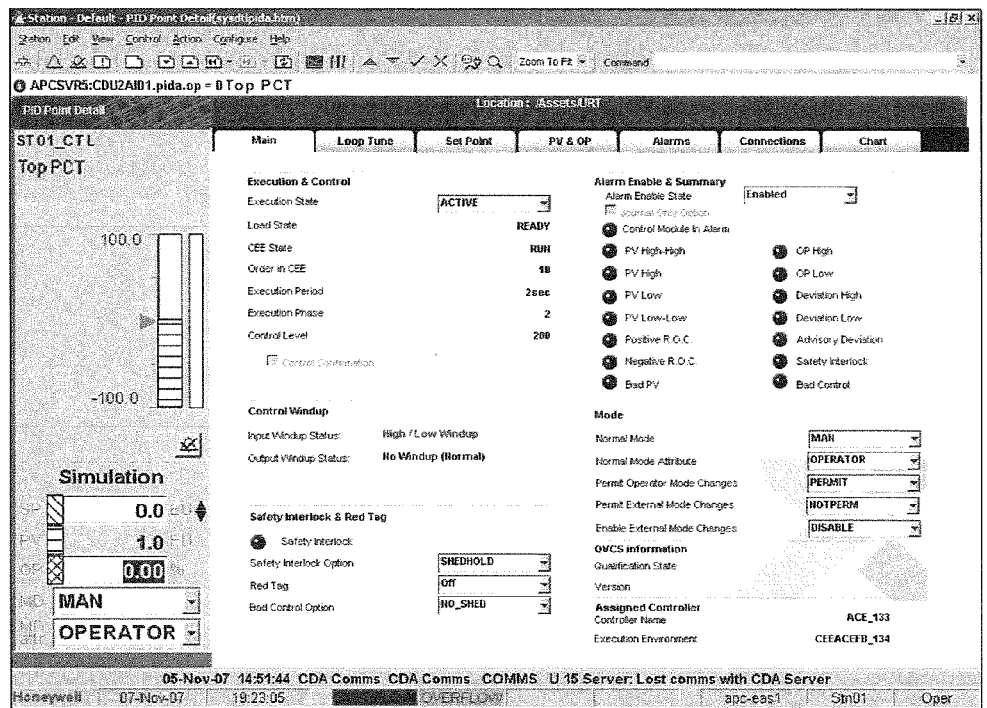
FIGURE 7 — 700
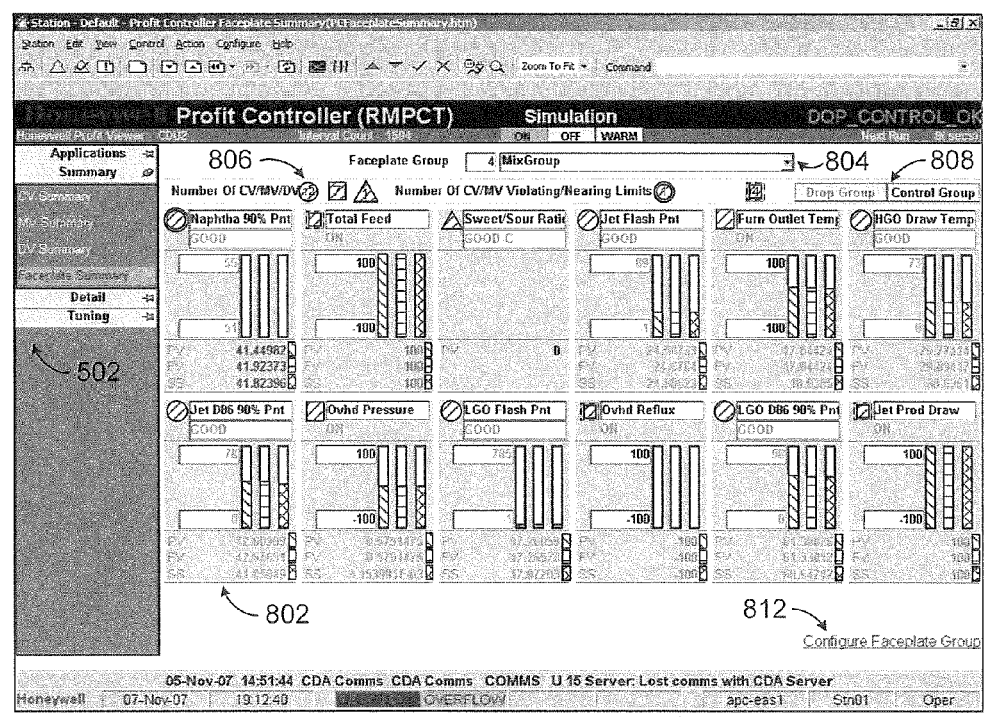
FIGURE 8 — 800

APPARATUS AND METHOD FOR VISUALIZATION OF CONTROL TECHNIQUES IN A PROCESS CONTROL SYSTEM

CROSS-REFERENCE TO RELATED APPLICATIONS

This application claims priority under 35 U.S.C. §119(e) to U.S. Provisional Patent Application No. 60/920,084 filed on Mar. 26, 2007, which is hereby incorporated by reference.

TECHNICAL FIELD

This disclosure relates generally to process control systems and more specifically to an apparatus and method for visualization of control techniques in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, controllers are often used to control one or more processes that are occurring or being implemented. The controllers could, for example, monitor the operation of the industrial equipment, provide control signals to the industrial equipment, and generate alarms when malfunctions are detected. Conventional process control systems are often responsible for monitoring and controlling numerous process variables, which generally represent characteristics of the process being monitored and controlled. Process variables typically include measurable process characteristics, as well as calculated values (which are often based on measurable process characteristics) used during process control. Human operators are then often responsible for monitoring and adjusting the controllers in the process control systems, thereby helping to ensure that the controllers are accurately modeling and controlling the processes.

SUMMARY

This disclosure provides an apparatus and method for visualization of control techniques in a process control system.

In a first embodiment, a method includes presenting a graphical display to an operator. The graphical display includes an image associated with at least a portion of a process. The graphical display also includes one or more icons identifying one or more process variables associated with at least the portion of the process. The method also includes receiving a selection of at least one of the icons from the operator and presenting a faceplate to the operator. The faceplate includes information associated with at least one of the process variables identified by at least one of the selected icons.

In particular embodiments, a shape of each icon (such as circular, square, or triangular) is based on a type of the process variable identified by the icon, and an indicator of each icon (such as shading or color) is based on a status of the process variable identified by the icon. The method could further include presenting a legend to the operator, where the legend identifies meanings of the icon shapes and the icon indicators.

In other particular embodiments, the method further includes receiving a selection of at least a portion of the faceplate from the operator and presenting at least one additional display to the operator. The at least one additional display could include a display containing information about at least one of the process variables and/or a display containing information about a controller used to control at least one aspect of the process. The method could also include the operator adjusting at least one value associated with one or more of the process variables using the faceplate and the at least one additional display.

In yet other particular embodiments, presenting the faceplate includes presenting a faceplate summary to the operator. The faceplate summary includes a plurality of faceplates associated with a plurality of process variables. The method could also include receiving information defining a configuration of the faceplate summary.

In still other particular embodiments, the faceplate is associated with a group of process variables, and presenting the faceplate includes presenting a group faceplate and individual process variable displays to the operator.

In a second embodiment, an apparatus includes at least one memory configured to store information associated with a plurality of process variables. The process variables are associated with at least a portion of a process. The apparatus also includes at least one processor configured to generate and present a graphical display to an operator. The graphical display includes (i) a focal variable symbol identifying a focal process variable and (ii) one or more additional variable symbols identifying one or more additional process variables associated with the focal process variable.

In particular embodiments, each of the one or more additional process variables is associated with a gain. Also, each additional variable symbol is positioned in the graphical display based on the gain associated with the additional process variable identified by that additional variable symbol. One portion of the graphical display is associated with negative gains, and another portion of the graphical display is associated with positive gains. A distance of each additional variable symbol from the focal variable symbol is proportional to the gain between the additional process variable identified by that additional variable symbol and the focal process variable.

In other particular embodiments, the at least one processor is further configured to receive a selection of one of the additional variable symbols from the operator and to present a second graphical display to the operator. The second graphical display includes a second focal variable symbol associated with the process variable that is identified by the selected additional variable symbol.

In yet other particular embodiments, the focal process variable represents a controlled variable. Also, the at least one processor is further configured to identify one or more causes of a change in a value associated with the controlled variable. The at least one processor may also be configured to generate a second graphical display that includes the focal variable symbol and one or more additional symbols. The one or more additional symbols may identify one or more other process variables that cause at least part of the change in the value associated with the controlled variable.

In still other particular embodiments, the graphical display presented to the operator is integrated with one or more additional graphical displays. The one or more additional graphical displays may include a trend display plotting values associated with one or more of the process variables over time and/or a variable grid identifying multiple ones of the process variables. The variable grid may be customizable by the operator.

In a third embodiment, a computer program is embodied on a computer readable medium. The computer program includes computer readable program code for presenting, in a graphical display, a list of applications executing on multiple nodes in a process control system. The computer program also includes computer readable program code for receiving a selection of at least one of the applications from an operator. In addition, the computer program includes computer readable program code for, in response to one or more commands from the operator, invoking execution of, presenting a second graphical display for viewing, and/or terminating the at least one selected application.

In particular embodiments, the computer program further includes computer readable program code for listing one or more of the applications within a workspace in the graphical display. The one or more applications are listed in the workspace without requiring the operator to manually connect to the one or more nodes executing the one or more applications.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2 through 27 illustrate an example graphical user interface for visualization of control techniques in a process control system according to this disclosure.

DETAILED DESCRIPTION

FIGS. 1 through 29, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
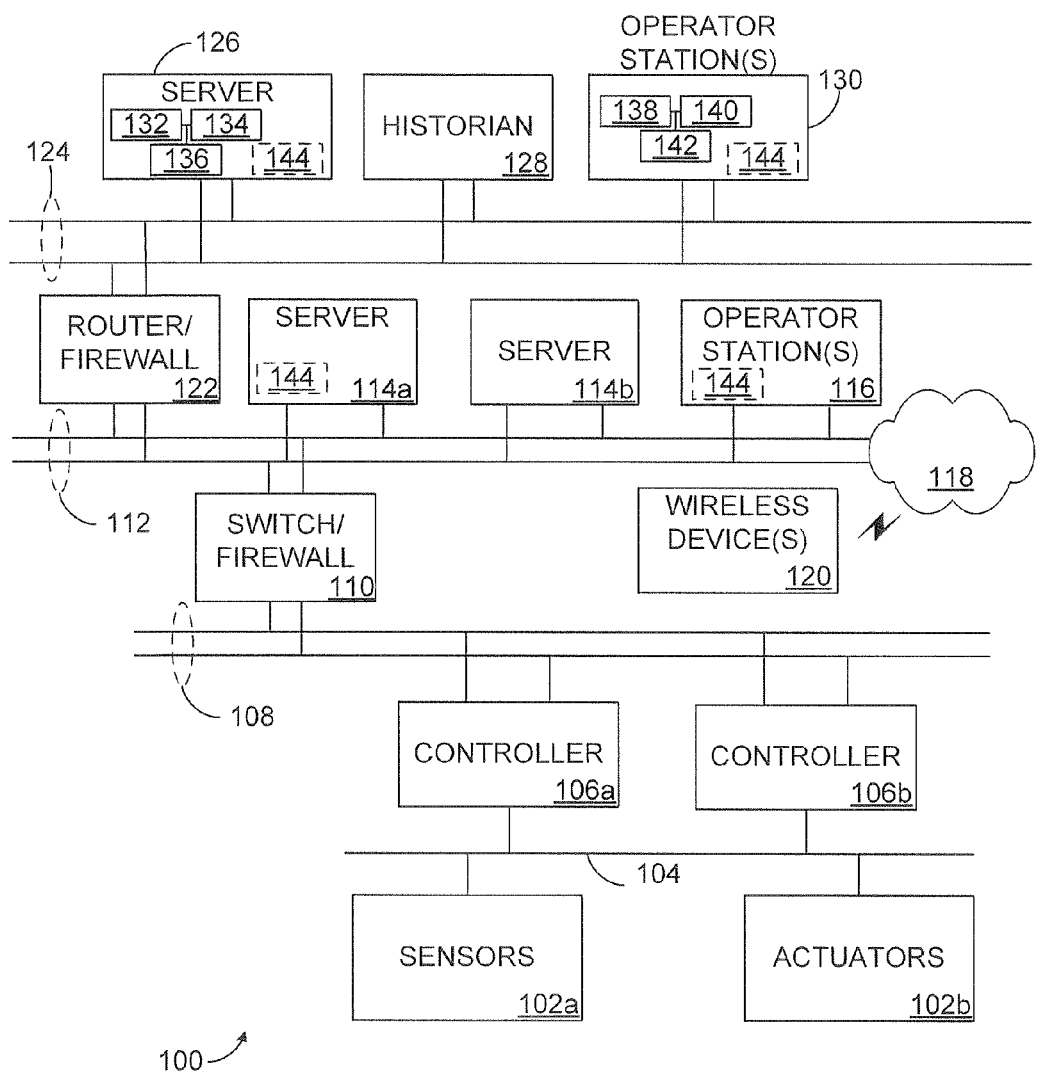
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a could measure a wide variety of characteristics in a process system, such as temperature, pressure, or flow rate. Also, the actuators 102b could alter a wide variety of characteristics in the process system and could represent components such as heaters, motors, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent multivariable predictive control (MPC) controllers or other types of controllers that implement control logic (such as logic associating sensor measurement data to actuator control signals). Each of the controllers 106a-106b could, for example, represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

A historian 128 is also coupled to the networks 124. The historian 128 generally collects information associated with the operation of the system 100. For example, the historian 128 may collect measurement data associated with the operation of the sensors 102a. The historian 128 may also collect control data provided to the actuators 102b. The historian 128 may collect any other or additional information associated with the process control system 100. The historian 128 includes any suitable storage and retrieval device or devices, such as a database.

One or more operator stations 130 are coupled to the networks 124. The operator stations 130 represent computing or communication devices providing, for example, user access to the servers 114a-114b, 126 and the historian 128. Each of the operator stations 130 includes any hardware, software, firmware, or combination thereof for supporting user access and control of the system 100. Each of the operator stations 130 could, for example, represent a computing device running a MICROSOFT WINDOWS operating system.

In particular embodiments, the various servers and operator stations may represent computing devices. For example, each of the servers 114a-114b, 126 could include one or more processors 132 and one or more memories 134 for storing instructions and data used, generated, or collected by the processor(s) 132. Each of the servers 114a-114b, 126 could also include at least one network interface 136, such as one or more Ethernet interfaces. Also, each of the operator stations 116, 130 could include one or more processors 138 and one or more memories 140 for storing instructions and data used, generated, or collected by the processor(s) 138. Each of the operator stations 116, 130 could also include at least one network interface 142, such as one or more Ethernet interfaces.

In one aspect of operation, at least one of the components in the system 100 can implement or support visualization functionality that allows operators to visualize and control the regulatory, advanced process control, optimization, or other control techniques being used in the process control system 100. For example, at least one visualization graphical user interface (GUI) 144 can be used in the system 100 to generate visual displays containing information about the control techniques used in the system 100. A visualization GUI 144 could, among other things, facilitate the identification, monitoring, and control over specific process variables in the system 100.

In general, a process being controlled by the process control system 100 is associated with various "process variables," which represent various aspects of the process. The system 100 may operate by attempting to maintain a "controlled variable" (CV) at or near a desired value (a setpoint) or within a desired operating range. The system 100 attempts to maintain the controlled variable by altering one or more "manipulated variables" (MVs), such as an opening of a valve or a speed of a turbine. A "disturbance variable" (DV) represents a condition that affects a controlled variable, where the disturbance variable can be considered by the system 100 when altering the manipulated variables but generally cannot be controlled (such as ambient temperature). By controlling certain controlled variables, the system 100 may improve or optimize the process being controlled.

Advanced Process Control (APC), optimization, and other control techniques are routinely used to control industrial processes, such as manufacturing plants, chemical plants, crude oil refineries, and ore processing plants. These techniques could, for example, operate to control one or more controlled variables through the manipulation of one or more manipulated variables and the consideration of one or more disturbance variables. In traditional distributed control system (DCS) environments, visualization is typically done by exception and out-of-the-normal workflow of an operator. In other words, visualization may not be part of the normal workflow or routine of the operator. This often results in the operator missing or ignoring important information that could provide operational improvements or that could be used to avoid or mitigate abnormal situations. This often then results in a loss of confidence in an application and ultimately the application being deactivated or over-constrained to the point where it provides little or no operational or economic benefit.

In accordance with this disclosure, the visualization GUI 144 supports visualization of regulatory, APC, optimization, and other control techniques in the process control system 100. In other words, the visualization GUI 144 allows operators to visualize the control techniques being used to control a process and to make adjustments to the control techniques. Moreover, this can be done in a manner that is more consistent with the operator's normal workflow.

In some embodiments, the visualization GUI 144 provides a rich variety of objects (shapes), such as through the use of hypertext markup language (HTML), scripting, and MICROSOFT .NET objects. These objects can be appropriately combined and leveraged as part of the visualization GUI 144, and the visualization GUI 144 can be integrated into the normal workflow of the operator. As a result, the visualization GUI 144 can be used to promote a better understanding of a control application and to promote more appropriate utilization of the application, as well as to drive increased benefits through their usage. As described in more detail below, the objects can include a series of icons, faceplates, charts, trends, and other objects that can be leveraged at a process overview (ASM Level 1), unit overview (ASM Level 2), and equipment overview (ASM Level 3) to impart information on the state, status, condition, and health of the control application. The objects also allow logical "linking" amongst themselves and standard DCS visualizations, which can be used to promote complete integration (and therefore acceptance and utilization) into the operator's visualization/control environment.

The objects used in the visualization GUI 144 to provide the visualization functionality can be used in any suitable environment. For example, the objects could be used in a standard visualization environment that provides other visualizations and displays to an operator. As a particular example, a set of objects for the visualization GUI 144 could be contained in a library within the DCS visualization environment. The objects could also be used as part of a standalone interface, such as a .NET interface, that is then used in conjunction with the DCS visualization environment.

Additional details regarding the visualization GUI 144 are provided below. Each visualization GUI 144 includes any hardware, software, firmware, or combination thereof for generating one or more graphical user interfaces for visualizing control techniques. As a particular example, each visualization GUI 144 could represent a software application or collection of applications executed by the processor(s) in a server or operator station in the process control system 100.

Although FIG. 1 illustrates one example of a process control system 100, various changes may be made to FIG. 1. For example, a control system could include any number of sensors, actuators, controllers, servers, operator stations, networks, and visualization GUIs. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which visualization of control techniques can be used. This functionality could be used in any other suitable device or system.

FIGS. 2 through 27 illustrate an example graphical user interface for visualization of control techniques in a process control system according to this disclosure. The graphical user interface shown here could, for example, represent the visualization GUI 144 in FIG. 1. The embodiment of the graphical user interface shown in FIGS. 2 through 27 is for illustration only. Other embodiments of the graphical user interface could be used without departing from the scope of this disclosure. Also, for ease of explanation, the graphical user interface of FIGS. 2 through 27 is described with respect to the process control system 100 of FIG. 1. The process control system 100 could use any suitable graphical user interface, and the graphical user interface of FIGS. 2 through 27 could be used with any suitable device and in any suitable system.

Figure 2:
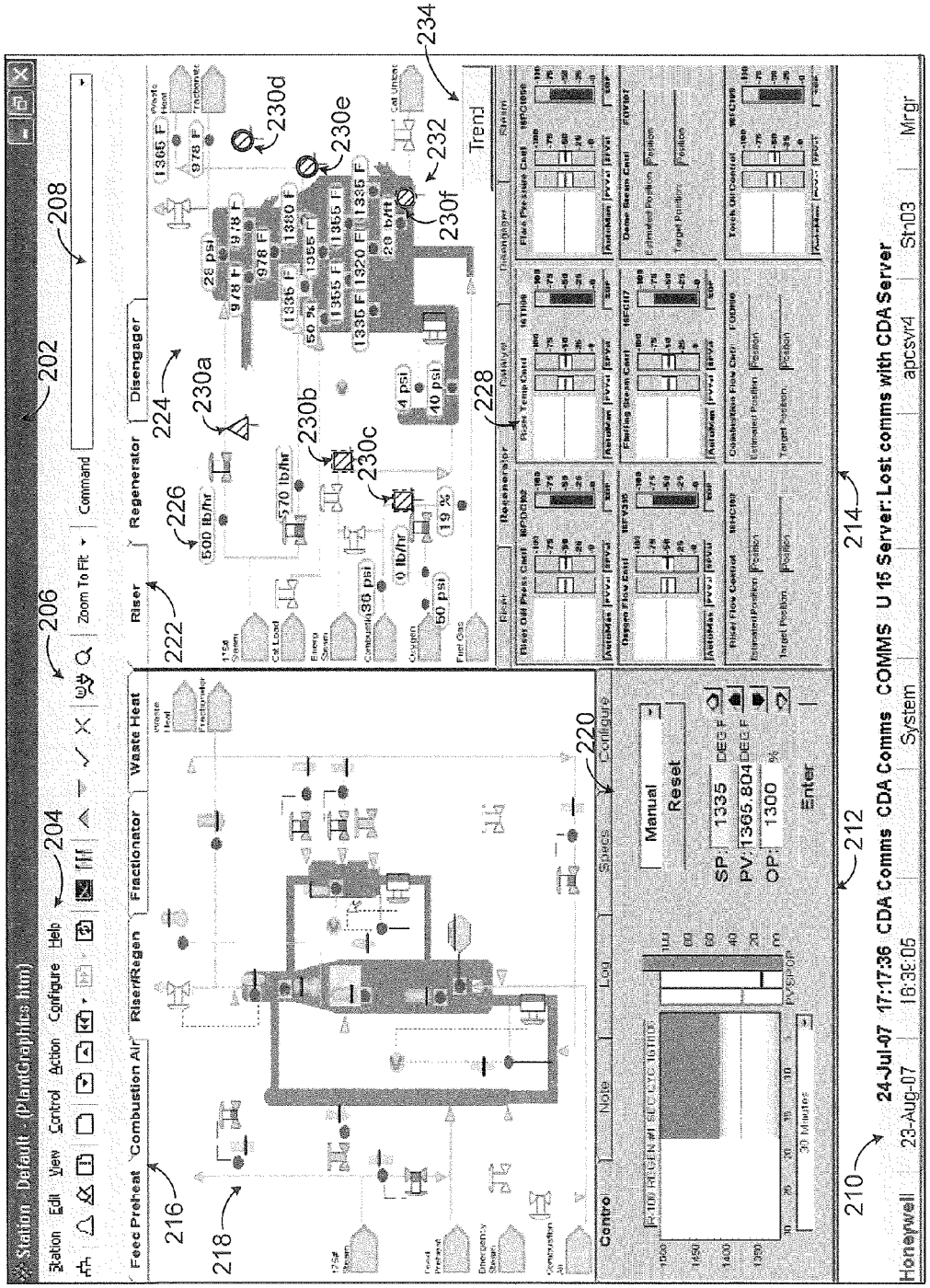

As shown in FIG. 2, a display 200 includes a window having a title bar 202, a menu 204, a toolbar 206 (which includes a command line 208), and two lower bars 210 containing various information. The menu 204 and toolbar 206 can be used to navigate to different displays and to invoke different functions. The command line 208 can be used by users to execute command line instructions, which could also be used to navigate and invoke functions. The lower bars 210 can be used to provide various information, such as status and alarm information, to an operator.

The remainder of the display 200 is divided into two display areas 212-214. The first display area 212 graphically illustrates a larger process (or portion thereof), while the second display area 214 graphically illustrates a smaller subsection of the larger process shown in the first display area 212. For example, as shown in FIG. 2, the first display area 212 includes tabs 216, which can be used to select larger portions of a process. An operator can select one of the tabs 216, which causes a graphical image 218 to be displayed in the first display area 212. The image 218 graphically represents the selected portion of the process (which was selected using the tabs 216). In this example, the image 218 represents the various industrial equipment, such as valves and heat exchangers, forming the selected portion of the process. The image 218 also identifies the inputs and outputs of the selected portion of the process. In addition, various controls 220 are provided for controlling the selected portion of the process. For instance, the controls 220 could be used to view trends of specific process variables over time, to establish setpoints for the process variables, and to establish whether the process variables are controlled manually or via a process controller.

The second display area 214 graphically illustrates smaller subsections of the selected portion of the process (which was selected using the tabs 216). Again, the second display area 214 includes tabs 222, which can be used to select specific subsections of the selected portion of the process. As a result, the tabs 216 and 222 can be used to navigate within a much larger process and to select specific subsections of that process. It should be noted, however, that the use of two display areas 212-214 and associated tabs for navigating a process are for illustration only. Any number of display areas and navigation mechanisms could be used to navigate a process.

A graphical image 224 is also displayed in the second display area 214. The image 224 graphically represents the selected subsection of the process (which was selected using the tabs 222). In this example, the image 224 represents the various industrial equipment, such as valves and heat exchangers, forming the selected subsection of the process. The image 224 also identifies the inputs and outputs of the selected subsection, as well as different process values 226 within the selected subsection (such as pressures and temperatures). In addition, various summaries 228 are provided for process variables in the system. The summaries 228 may, for instance, identify estimated and actual values of a process variable, the percentage of the actual process variable value compared to its maximum value, and whether the process variable is within specified limits.

Various icons 230a-230f are also provided in the second display area 214. The icons 230a-230f are associated with different process variables in the process system. As described below, an individual icon 230a-230f can be selected by an operator, which may present the operator with a process variable faceplate that can be used to view additional information associated with and to configure or control a process variable. Moreover, the icons 230a-230f could be associated with checkboxes 232. One or multiple icons 230a-230f can be checked by the operator, and a trend plot can be generated for the selected icon(s) using a trend button 234. In these ways, the display 200 provides a logical way for an operator to view and control various process variables, which can be done in a manner consistent with the operator's normal workflow.

Figure 3:
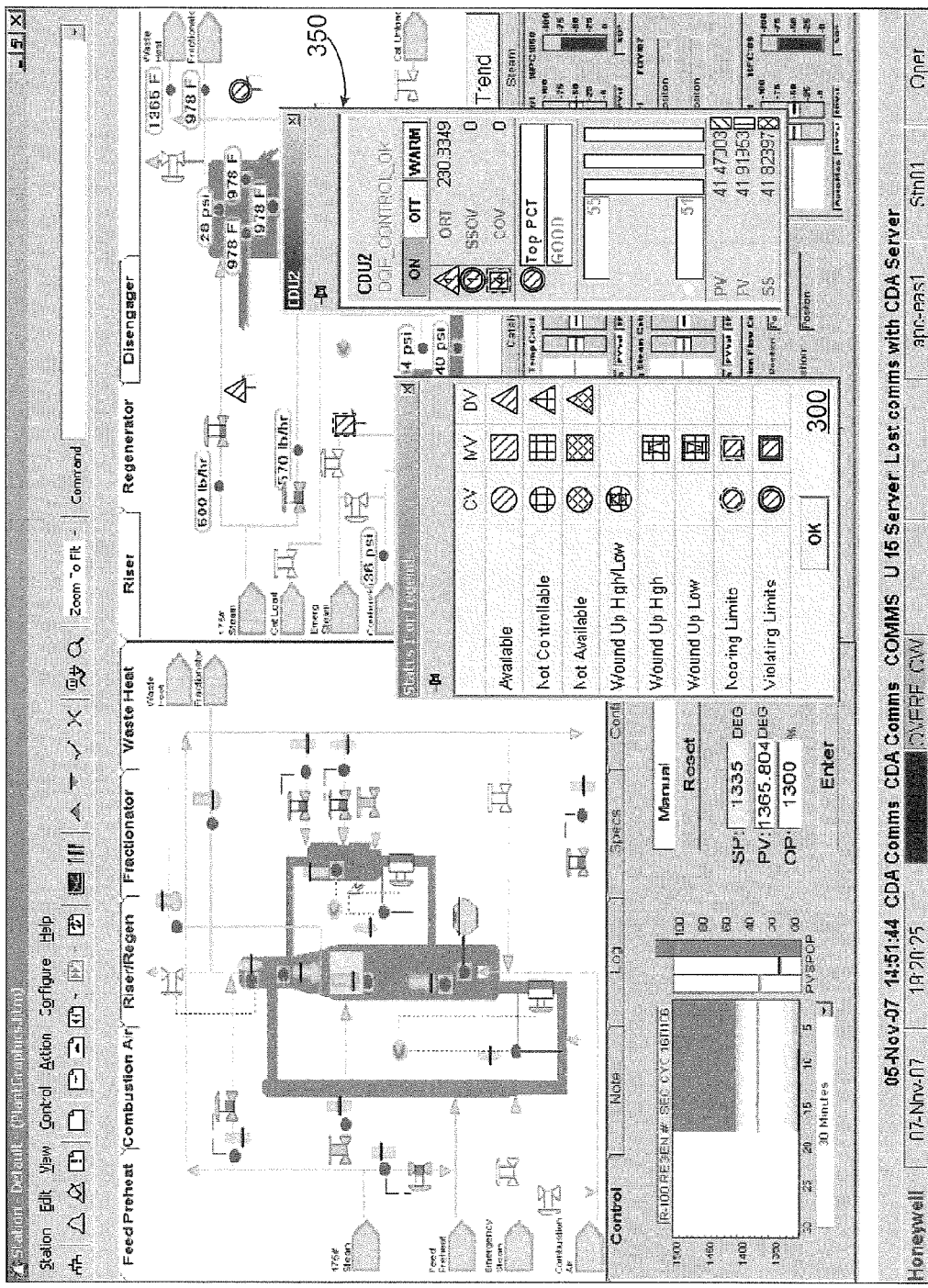

As shown in FIG. 3, a legend 300 can be presented to the operator, where the legend illustrates the different types of icons that can be presented in the display 200. The legend 300 could be provided to the operator in response to any suitable input, such as the appropriate command line command or selection of the appropriate entry in the menu 204, toolbar 206, or right mouse click menu. As shown in this example, circle icons represent controlled variables, square icons represent manipulated variables, and triangle icons represent disturbance variables. Also, the shadings of the icons, halos (or lack thereof) around the icons, and symbols within the icons can be used to represent the status of the variables associated with the icons. For instance, different shadings could indicate whether a variable is available for use by a controller, not controllable by a controller, or not available for use by a controller. Also, a dashed halo around an icon could indicate that the associated variable is approaching one of its limits, while a solid halo around an icon could indicate that the associated variable has violated one of its limits. In addition, symbols within the icons could indicate whether a controlled variable is wound up (cannot be controlled further since all of its manipulated variables are constrained) and whether a manipulated variable is wound up low or high.

It may be noted that while shadings and dashed/solid halos have been described above, any other or additional indicators could be used with the icons. For example, the icons could have colors instead of shadings, such as green for available (and for approaching/violating limits), yellow for not controllable or wound up, and red for not available. Also, the halos could have different colors instead of or in addition to line patterns, such as yellow for nearing a limit and red for violating a limit. In addition, different shapes and shape "deformations" can be used, such as by using a triangle or other shape that has a corner folded over when something changes.

As noted above, an operator can select icons 230a-230f that are presented in the display 200. An icon in FIG. 2 can be selected in any suitable manner, such as when an operator clicks on the icon using a mouse or other input device. Selection of an icon in FIG. 2 may present the user with a faceplate 350 that, as shown in FIG. 3, is displayed in a window over the display 200. In this example, the faceplate 350 identifies various information associated with the selected icon 230a-230f, such as the name and status of a controller and the name and status of the process variable. The contents of the faceplate 350 may vary depending on whether the selected icon is associated with a controlled, manipulated, or disturbance variable. Examples of the different faceplates that could be presented to an operator are shown in FIGS. 4A through 4C, which are described below.

Using icons in this manner, a wide variety of information can be presented to an operator via the display 200. For example, various process variables can be identified within a graphical image representing a process (or portion thereof). This may allow the operator to quickly and easily identify where different process variables are located within a process. This can also illustrate to the operator which process variables are available for monitoring and control. The indicators used with the icons (such as shadings/colors, halos, and symbols) can quickly inform the operator of the status of the process variables, allowing the operator to identify problems in a process being controlled. In addition, as described below, the icons and faceplates can be used to quickly and easily access more detailed information about the process variables, which can allow for a more logical flow of information to the operator.

As noted above, the faceplate 350 can be presented to an operator when an icon in the display 200 is selected. The contents of the faceplate 350 presented to the operator may vary depending on the type of process variable associated with the selected icon. FIGS. 4A through 4C illustrate examples of the faceplates that could be presented to the operator.

Figure 4A:
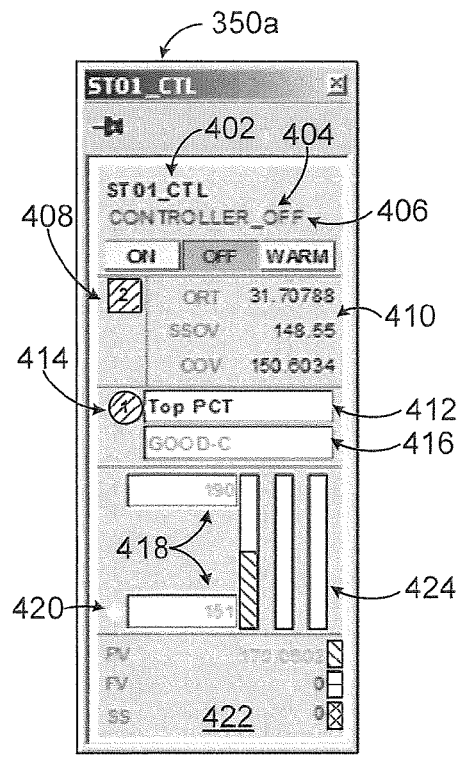
Figure 4B:
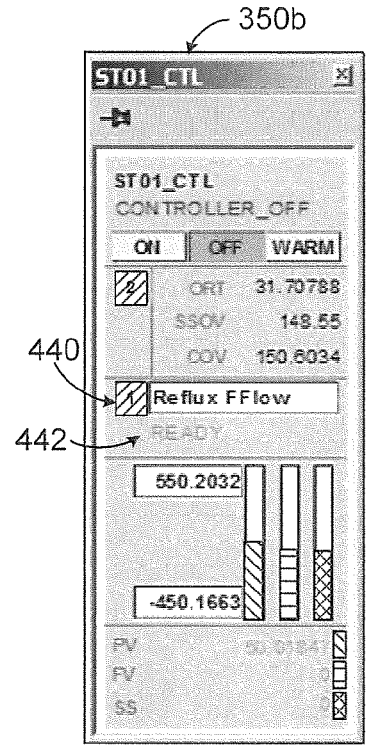
Figure 4C:
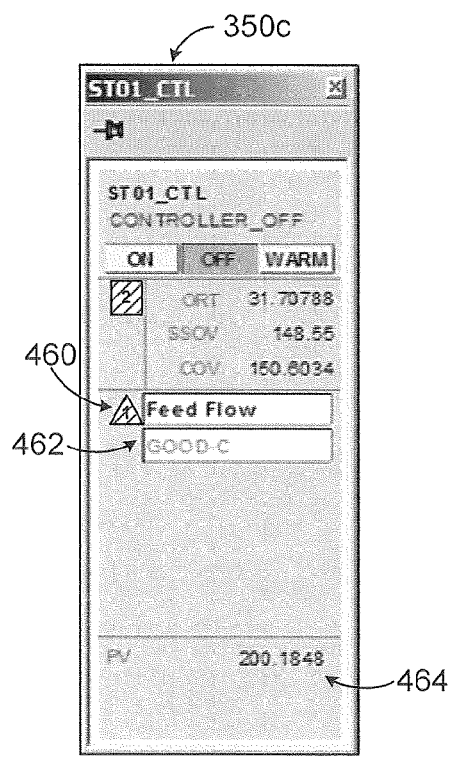

A faceplate 350a having the form shown in FIG. 4A could be displayed when a controlled variable's icon is selected by the operator. In this example, the upper portion of the faceplate 350a is associated with a controller, and the lower portion of the faceplate 350a is associated with the selected controlled variable. For example, the faceplate 350a includes a name 402 of a controller associated with the selected controlled variable, such as the name of the controller that is controlling or may control the selected controlled variable. The faceplate 350a also includes a status 404 of the controller and a mode 406 of the controller. The controller status 404 could, for instance, represent one of the statuses supported in the EXPERIONPKS system from HONEYWELL INTERNATIONAL INC. The controller mode 406 in this example is on (the controller is controlling a process), off (the controller is not controlling a process), or warm (the controller is intended for commissioning and operating but is not altering any manipulated variables). The operator could alter the mode of the controller using the faceplate 350a.

The faceplate 350a also includes zero or more variable identifiers 408. The variable identifiers 408 indicate the number of variables used by the identified controller (and the presence of halos can indicate whether these variables are nearing or violating their limits). In this example, the variable identifiers 408 include a square with a "2," indicating that two manipulated variables can be used to control the controlled variable associated with the faceplate 350a. Further, various control indicators 410 are provided in the faceplate 350a. The control indicators 410 provide various control-related information about the controller. In this example, the control-related information includes the objective response time (OPT), steady-state objective value (SSOV), and current objective value (COV) associated with the controller. These or other or additional control-related values could be determined in any suitable manner.

The remainder of the faceplate 350a deals with the specific controlled variable associated with the selected icon. For example, the faceplate 350a includes a variable name 412, which identifies the name of the controlled variable. The faceplate 350a also includes a type indicator 414, which identifies the type of the selected variable (in this case, a controlled variable). This can be the same status icon displayed in the display 200, so the indicator 414 can also provide controller variable status information. The faceplate 350a further includes a status indicator 416. For a controlled variable, the status indicator 416 could indicate whether the controlled variable is: initializing, inactive, good (the controller is receiving a good signal), dropped (the controller is not using the variable in a control solution), critical (a critical variable is bad), predicted (the controller is using a predicted variable value instead of an actual variable value), or wound up. A-C suffix can be used in the status indicator 416 to identify a critical controlled variable, or a variable that the controller is required to use.

Other information related to the specific controlled variable includes high and low limits 418, which define the desired range for the controlled variable. The limits 418 can be controlled by an operator, such as when the operator enters values into text boxes in the faceplate 350a. An indicator 420 can be used to indicate whether the actual value of the controlled variable is close to or violating that limit. For example, an up arrow can indicate that a limit is being ramped up, while a down arrow can indicate that the limit is being ramped down. A solid diamond can indicate that a hard limit has been reached, and an open diamond can indicate that a soft limit has been reached. Further, the faceplate 350*a* may present various control-related values 422 associated with the selected controlled variable. These values 422 could, for instance, include a read or last actual value (PV), a future or predicted value (FV), and a steady-state value (SS) of the controlled variable. In addition, a chart 424 may graph these values 422 with respect to the high and low limits 418 using different bars. In this example, the bars have different shadings, although any other suitable indicators could be used (such as different colors).

A faceplate 350*b* having the form shown in FIG. 4B could be displayed when a manipulated variable's icon is selected by the operator. In this example, the faceplate 350*b* includes some of the same or similar information as shown in FIG. 4A and described above, such as various controller and variable information. In this example, a type indicator 440 identifies the faceplate 350*b* as being associated with a manipulated variable. Also, because the faceplate 350*b* is associated with a manipulated variable, a status indicator 442 of the manipulated variable may take on different values from those described above. For a manipulated variable, the status indicator 442 could indicate whether the manipulated variable is: initializing, on (the variable is available to a controller turned on), ready (the variable is available to a controller turned off), inactive, feed-forward (the variable is used as a feed-forward value), low (the variable is clamped low or is at its low limit), high (the variable is clamped high or is at its high limit), or severed (communication with a process has been lost, which could be ignored for non-critical variables).

A faceplate 350*c* having the form shown in FIG. 4C could be displayed when a disturbance variable's icon is selected by the operator. In this example, the faceplate 350*c* includes some of the same or similar information as shown in FIGS. 4A and 4B and described above, such as various controller and variable information. In this example, a type indicator 460 identifies the faceplate 350*c* as being associated with a disturbance variable. Also, because the faceplate 350*c* is associated with a disturbance variable, a status indicator 462 of the disturbance variable may take on different values than those described above. For a disturbance variable, the status indicator 462 could indicate whether the manipulated variable is: inactive, good, dropped, or critical. A-C suffix can be used in the status indicator 462 to identify a critical disturbance variable. In addition, one control-related value 464 (the actual value of the disturbance variable) is presented in the faceplate 350*c*, and this value may or may not be plotted in a chart.

Through the use of the faceplates 350*a*-350*c*, an operator can select various process variables identified in the display 200 and review high-level information associated with those process variables. The operator can also make various changes to the process variables, such as their high and low limits. Moreover, this can be done via the display 200, allowing the faceplates 350*a*-350*b* to be incorporated into the normal workflow of the operator. In addition, more specific information about the process variables could be presented to the operator via the faceplates 350*a*-350*c*. For instance, the faceplates 350*a*-350*c* could be configured (and re-configurable) to present additional displays to the operator, such as when the operator clicks anywhere within the faceplate or on a specific part of the faceplate.

Figure 5:
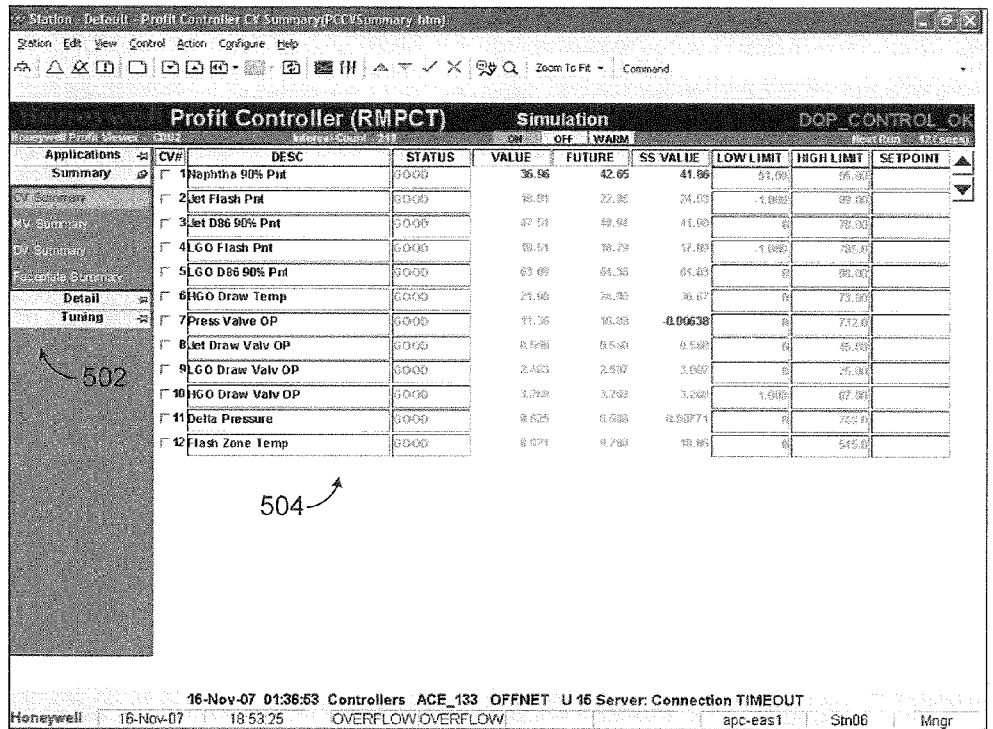

In some embodiments, selection of a faceplate 350 or a location within the faceplate 350 (such as within the upper portion of the faceplate) could present an operator with the display 500 shown in FIG. 5. This display 500 allows the operator to review much more specific details regarding a controller, such as the controller's controlled, manipulated, and disturbance variables. The display 500 also allows the operator to configure the controller, such as by setting various values associated with the process variables and to engage in tuning and optimization functions. In this example, the display 500 includes a navigation bar 502 and a display area 504. The navigation bar 502 allows the user to select different types of information to view and/or adjust, such as controlled, manipulated, and disturbance variable summary, detail, and process pages. Also, the "thumbtack" symbols can be used to expand or contract various categories of information that can be selected in the navigation bar 502. The display area 504 presents different information to the operator, depending on where the operator is currently navigating in the navigation bar 502. Here, the display area 504 presents various controlled variable information to the operator, such as variable numbers, names, descriptions, current values, future values, steady-state values, low and high limits, and setpoints. The user could also change various ones of these values (such as the low and high limits and setpoints) to alter the control of a process.

Figure 6:
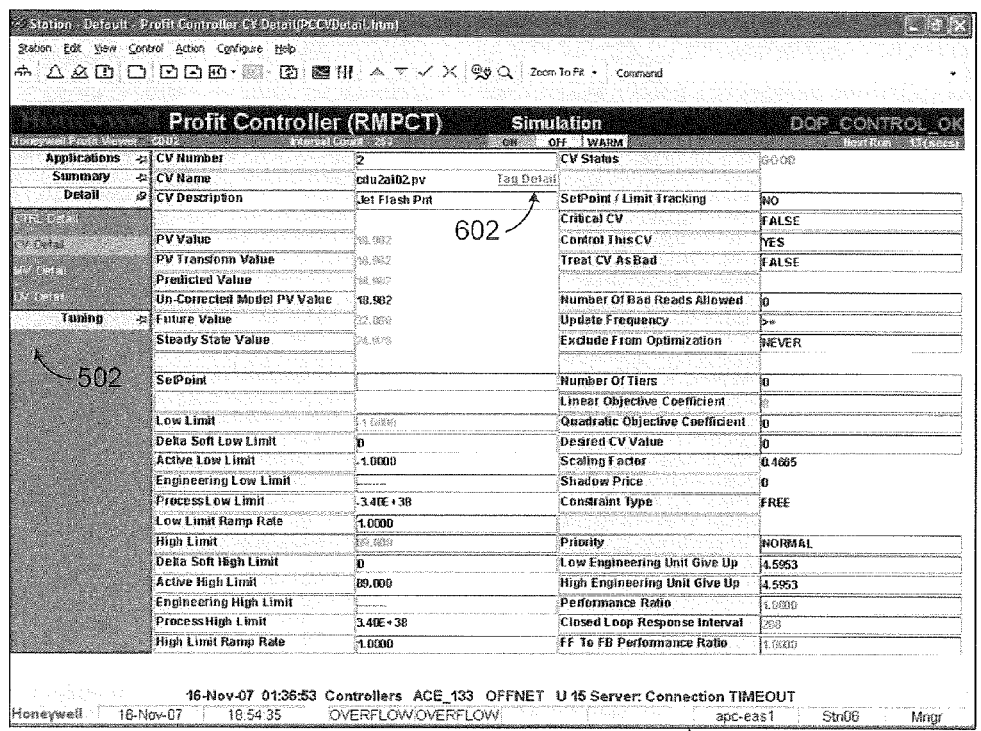

If the operator selects a specific variable in the display area 504 (such as by clicking on a variable's number or description), the operator could be presented with a display 600 as shown in FIG. 6. This display 600 could also be accessed directly via a faceplate 350, such as by clicking within the lower portion of the faceplate. The display 600 presents much more detailed information about a specific process variable (in this case, a controlled variable). For example, the information includes the variable's number, name, description, as well as its values, setpoint, and limits. The information also includes the variable's status, whether certain operations or functions are performed for the variable, and other information.

In addition, the display 600 includes a link 602 associated with the process variable. Selection of this link 602 may present the operator with a display 700 as shown in FIG. 7. The display 700 could also be accessed directly, such as by configuring a faceplate 350 to direct the operator to the display 700 directly when the faceplate 350 is selected by an operator. The display 700 represents a regulatory display that illustrates how the specific process variable is controlled in the specified controller. The display 700 can therefore be used by the operator to alter the actual control solution used by a controller to control the specific process variable. The displays shown in FIGS. 5 through 7 may represent standard displays used in the EXPERIONPKS system. However, these displays are integrated into the standard workflow of an operator via the use of the icons in the display 200 and via the use of the faceplates 350.

It is also possible to view multiple process variables' faceplates simultaneously. One example of this is shown in FIG. 8. In this example, a display 800 presents faceplates for multiple variables, such as for different variables associated with the same controller. In particular embodiments, the display 800 is configurable (as described below) and can include a maximum number of faceplates, such as twelve. As shown in FIG. 8, the display 800 includes a faceplate area 802, which displays one or multiple faceplates. Each of these faceplates could represent one of the faceplates 350*a*-350*c* described above, depending on the type of process variable associated with each faceplate.

The display 800 also includes controls 804, which can be used by the operator to select different groups of faceplates. The operator could, for example, type a faceplate group's number into a text box or select a faceplate group from a drop-down menu. The display 800 further includes a summary 806, which identifies the types of process variables and the number of each type contained in the selected faceplate group. The summary 806 also identifies the number and type of variables that are nearing or violating their limits in the selected faceplate group. In addition, buttons 208 can be used to drop a variable from a group and to control the group. In some embodiments, a critical variable cannot be dropped from a group, and the "Drop" button 208 could be inaccessible when a critical variable is selected in the display 800.

The display 800 shown in FIG. 8 could be accessible by an operator in any suitable manner, such as via the menu 204, a button in the toolbar 206, a command entered in the command line 208, or the navigation bar 502.

Figure 9:
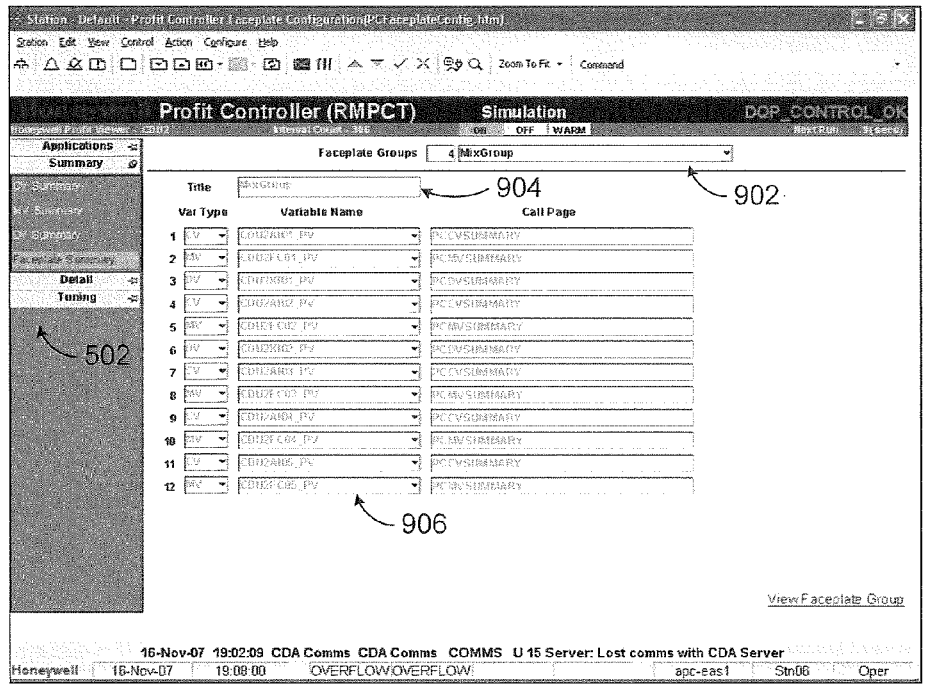

The faceplates presented in the display 800 can be configured using a configuration display 900 as shown in FIG. 9. The display 900 could be presented, for example, after an operator selects a configuration link 812 in the display 800. In this example, the configuration display 900 includes controls 902 for selecting a particular faceplate group and an identifier 904 of the currently-selected faceplate group.

The display 900 also includes controls 906 for configuring the variables displayed for the selected faceplate group. In this particular embodiment, the controls 906 allow an operator to select up to twelve process variables for inclusion in a faceplate group. For each variable, the operator can specify the type of the variable, the name of the variable, and a "call page" for the variable. The variable type is identified in a drop-down menu, which could include options such as CV, MV, and DV. The variable name could be selected from another drop-down menu, and the contents of the variable name drop-down menu could be based on the value selected by the operator in the variable type drop-down menu. The "call page" represents the display that is presented to the operator when the faceplate for the process variable is selected. As noted above, various displays can be presented to the operator when a faceplate is selected, such as the display 500 of FIG. 5 or the display 700 of FIG. 7. The "call page" for each process variable could be specified in a text box or other input mechanism.

Figure 10:
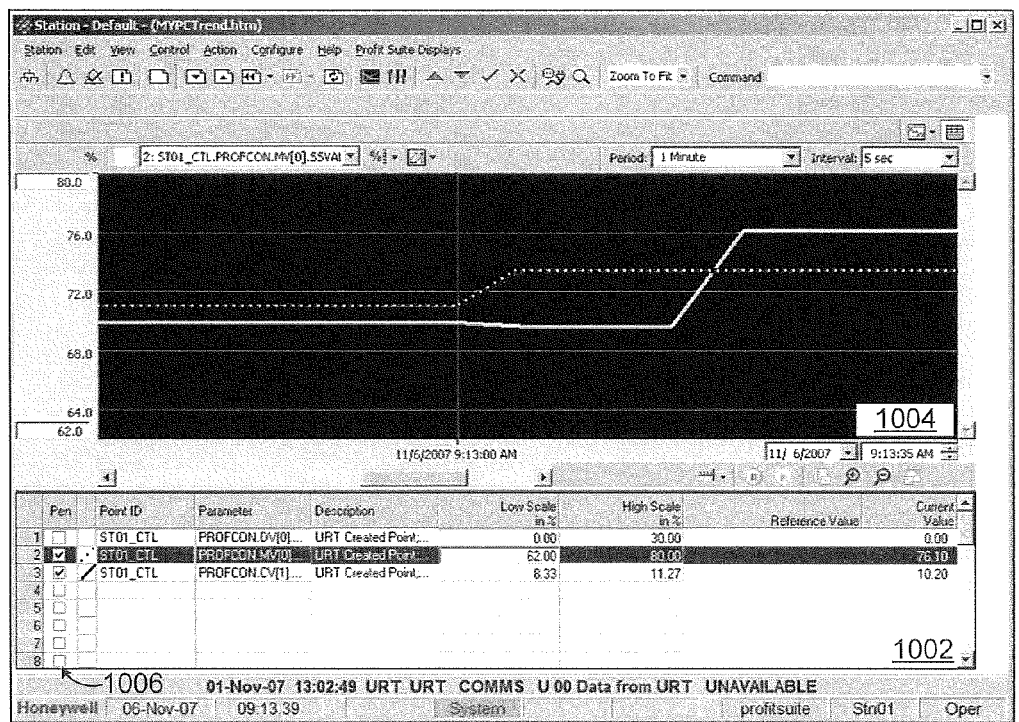

Returning to FIG. 2, as noted above, the checkboxes 232 in the display 200 can be used to select particular process variables, and the trend button 234 in the display 200 can be selected to view trend information for those selected variables. One example trend display is shown in FIG. 10. In this example, a display 1000 includes a variable selection area 1002 and a trend plot 1004. The variable selection area 1002 allows an operator to select particular variables and provides various information associated with those variables. For instance, all of the process variables checked by the operator using the checkboxes 232 in the display 200 could be listed in the variable selection area 1002. The operator may then select which ones of those variables are displayed in the trend plot 1004 using checkboxes 1006. The variable selection area 1002 also identifies a color, pattern, or other indicator associated with each of the variables.

The trend plot 1004 plots the values of the selected process variables over time. Lines in the trend plot 1004 use the same colors, patterns, or other indicators shown in the variable selection area 1002. In this way, an operator can quickly and easily define and view trends of specific variables over time. The operator can also quickly adjust which variables are shown in the trend plot 1004. It may be noted that the use of checkboxes and trend plots is one example of a function that could be initiated via the display 200. Any other type of interaction, such as those used to store variable information in an intermediate database for the purpose of trending or presenting any tabular information about the selected variables, could be used.

Figure 11:
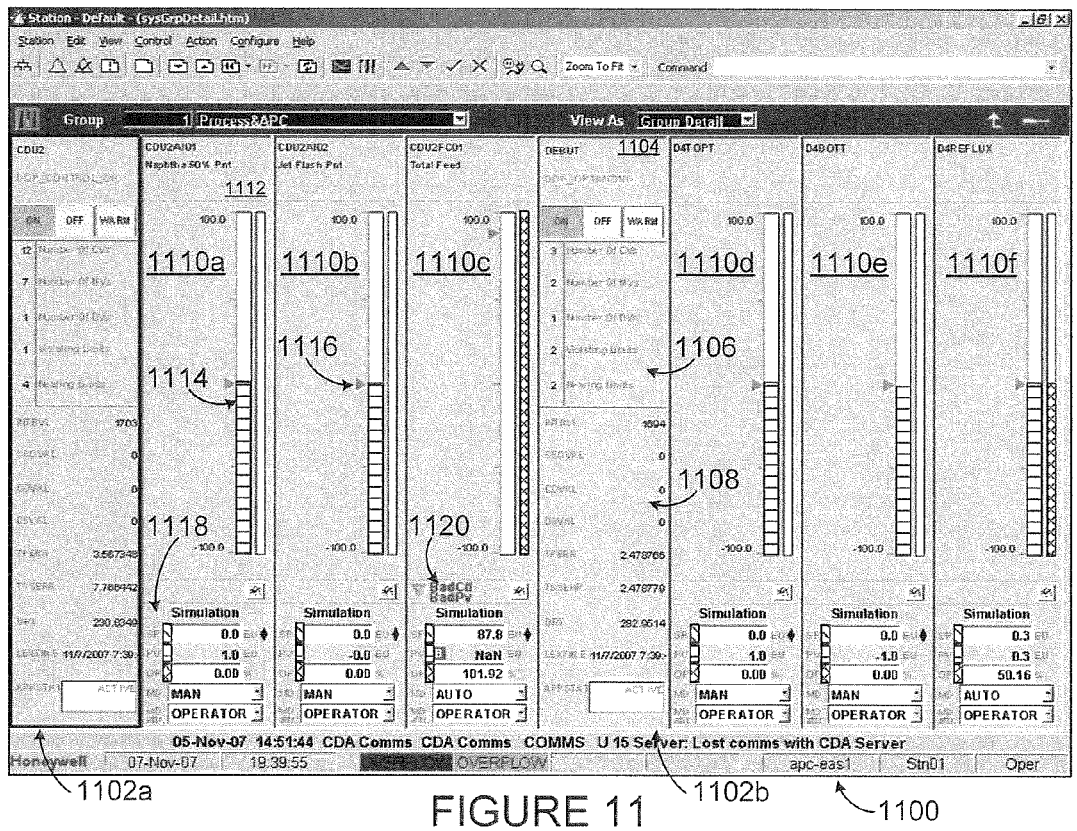

While various figures above have describe the use of faceplates for individual process variables, the visualization GUI 144 is also capable of providing faceplates associated with groups of process variables. One example of this is shown in FIG. 11, which illustrates a display 1100 that includes two group faceplates 1102a-1102b. Each of the group faceplates 1102a-1102b is associated with a group of process variables, such as a group of variables used by a single controller in the system 100. In this example, each of the group faceplates 1102a-1102b includes a controller section 1104, which includes information associated with the controller (such as its name and status) and controls for the controller mode. Each of the group faceplates 1102a-1102b also includes a variable summary section 1106, which identifies the number of each type of variable associated with the controller and the number of those variables that are nearing or exceeding their limits. In addition, each of the group faceplates 1102a-1102b includes control indicators 1108 that provide various control-related information about the controller, including an application status (whether a controller is active or inactive).

Following each of the group faceplates 1102a-1102b (moving left to right in FIG. 11) is one or more variable display areas, including three variable display areas 1110a-1110c following the group faceplate 1102a and three variable display areas 1110d-1110f following the group faceplate 1102b. Each of the variable display areas 1110a-1110f presents information regarding a process variable in a group (where the group is identified by the group faceplate to the left of the variable display area). In some embodiments, the variable display areas 1110a-1110f present information about the most important or critical variables in the groups or about variables selected by an operator. In particular embodiments, the number of variable display areas for each group faceplate could be limited, such as to eight.

In this example, each of the variable display areas 1110a-1110f includes a variable section 1112, which includes the name and description of a particular process variable. Each of the variable display areas 1110a-1110f also includes charts 1114, which graphically illustrate the actual values of the process variable (PV) and a percentage of the actual value within its range (OV). An indicator 1116 can be used in the charts 1114 to illustrate the desired setpoint for a process variable. Each of the variable display areas 1110a-1110f further includes controls 1118, which can be used to adjust the setpoint, mode, and other values of the process variable or attributes of the controller. In addition, warnings 1120 can be presented to the operator, such as when a process variable is not near its setpoint or cannot be determined.

Figure 12:
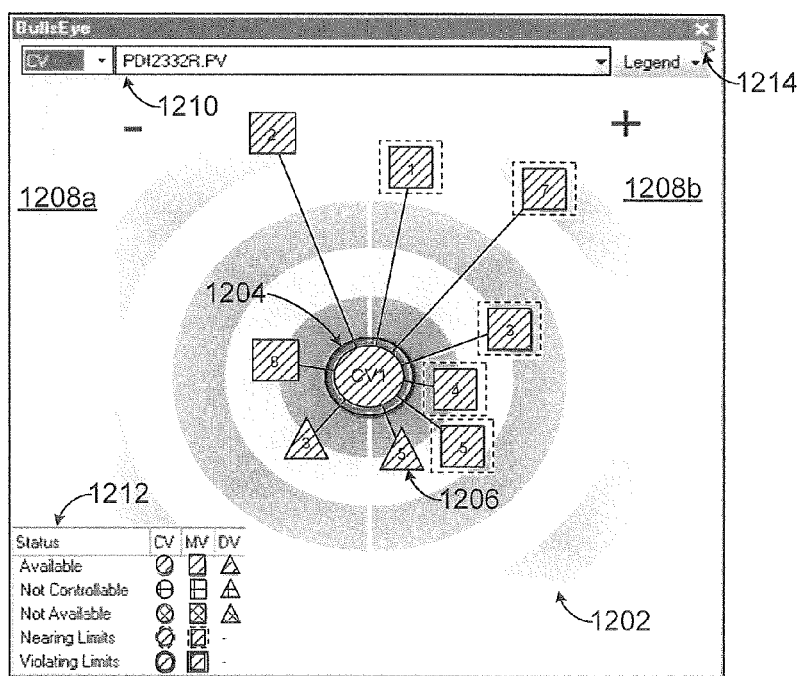

While faceplates are one type of display that can be presented to an operator, additional types of displays can also be presented to an operator. These displays could be accessible in any suitable manner, such as via the menu 204, toolbar 206, command line 208, or selection of process variable icons in the display 200. One example of an additional type of display is a "bull's eye" display, an example of which is shown in FIG. 12. This type of display could, for example, be displayed when the operator selects a particular process variable in various ones of the displays provided by the visualization GUI 144.

As shown in FIG. 12, a display 1200 includes a set of concentric circles 1202 forming a target. At the center of the concentric circles 1202 is a focal variable symbol 1204, which represents the process variable that is the focus of the display 1200. Additional variable symbols 1206 are displayed around the focal variable symbol 1204 and represent process variables that are associated with the focal variable symbol 1204. For example, if the focal variable symbol 1204 is a controlled variable, the additional variable symbols 1206 could represent manipulated variables used to control the controlled variable and disturbance variables affecting the controlled variable. If the focal variable symbol 1204 is a manipulated variable, the additional variable symbols 1206 could represent controlled variables that are controlled using that manipulated variable. If the focal variable symbol 1204 is a disturbance variable, the additional variable symbols 1206 could represent variables that are affected by that disturbance variable. Numerical identifiers in the additional variable symbols 1206 can be used to distinguish the symbols 1206 (and the process variables associated with the symbols 1206).

The display 1200 is also divided into two halves 1208a-1208b, which are associated with different gains or other defining process characteristics of the process variables. Gain is a model parameter that determines the magnitude and direction of the effect of an independent (manipulated or disturbance variable) on a dependent (controlled) variable. In many cases, this indicates the order of manipulated variable movement for a given constraint situation, so it is often important for an operator to know the gain values. Here, process variables with negative gains are identified by symbols 1206 in the left half 1208a of the display 1200, and process variables with positive gains are identified by symbols 1206 in the right half 1208b of the display 1200. Also, the distance of an additional variable symbol 1206 from the focal variable symbol 1204 is proportional to the gain value for the variable associated with that symbol 1206. For example, additional variable symbols 1206 that are closer to the focal variable symbol 1204 may have a lower gain compared to additional variable symbols 1206 that are farther from the focal variable symbol 1204. In particular embodiments, the number of additional variable symbols 1206 in the display 1200 can be limited, such as to ten symbols. Although described as being associated with gains, the variable symbols could be associated with any other or additional defining process characteristic(s).

In this example, the display 1200 includes various controls 1210 for controlling the bull's eye display. For example, a drop-down menu can be used to select a type of variable (CV, MV, or DV), and another drop-down menu can be used to select the name of a specific process variable. That specific process variable can then be associated with the focal variable symbol 1204, and the additional variable symbols 1206 for that specific process variable can be presented in the display 1200. Also, a legend button can be used to present a legend 1212 to the operator. In this example, the symbols for the process variables are similar to the ones contained in FIG. 2.

Figure 13:
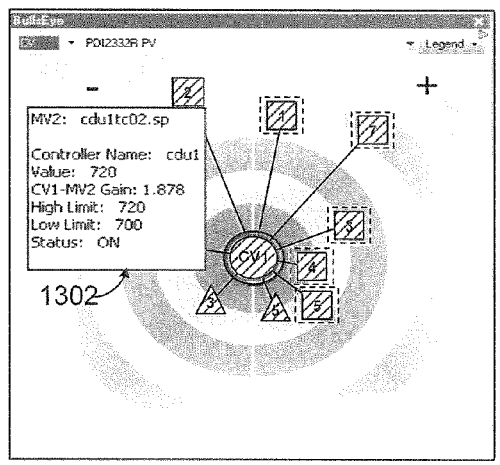

The display 1200 shown in FIG. 12 can provide various information to an operator. For instance, in this example, the display 1200 itself shows the operator which manipulated and disturbance variables affect a controlled variable and the relative gains of those manipulated and disturbance variables. As another example, if the operator selects one of the additional variable symbols 1206 in the display 1200 (such as by clicking on that symbol), the display 1200 can be refreshed with the selected additional variable symbol 1206 as the focal variable symbol 1204. As a third example, if the operator places a mouse cursor over a particular variable symbol 1204-1206, a pop-up window 1302 can be presented to the operator as shown in FIG. 13. The pop-up window 1302 can present information about the process variable associated with the variable symbol 1204-1206. In this example, the pop-up window 1302 identifies the name and status of the process variable, the controller associated with the process variable, and values and limits associated with the process variable. Also, if the operator places a cursor over one of the additional variable symbols 1206, the pop-up window 1302 can identify the gain between the focal process variable (the variable associated with the focal variable symbol 1204) and the process variable associated with that additional variable symbol 1206.

Returning to FIG. 12, if a controlled variable is selected as the focal point of the display 1200, a smart tag 1214 can be presented in the display 1200. The smart tag 1214 can be selected by an operator to reveal various user options. These user options could include the ability to set the number of additional variable symbols 1206 displayed, as well as the ability to view causes of controlled variable moves (an explanation as to why the value of a controlled variable is changing).

Figure 14:
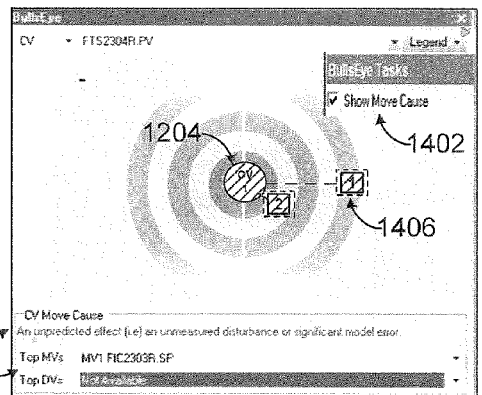

The cause(s) of a controlled variable move can be presented as shown in FIG. 14. In this example, a display 1400 has been presented to the operator after selection of a "Show Move Cause" checkbox 1402 (which can be viewed by selecting the smart tag 1214 in FIG. 12). The display 1400 includes the same focal variable symbol 1204 and one or more top-affecting variable symbols 1406. The top-affecting variable symbols 1406 represent the manipulated and/or disturbance variables that most affect the controlled variable associated with the focal variable symbol 1204. For example, the top-affecting variable symbols 1406 could identify up to two manipulated variables and two disturbance variables that most affect the controlled variable. Also, the lines coupling the focal variable symbol 1204 to the top-affecting variable symbols 1406 can vary. For instance, solid lines could be associated with the manipulated and disturbance variables that most significantly affect the controlled variable, and dashed lines could be associated with the manipulated and disturbance variables that next most significantly affect the controlled variable. In addition, controls 1408 in the form of drop-down menus can be used by the operator to select one of the variables that most significantly affects the focal controlled variable. An explanation 1410 can then be provided that explains how or why the variable selected using the controls 1408 affected the focal controlled variable. The cause of a controlled variable movement (the explanation 1410) can be determined in any suitable manner, and one example technique is provided below.

Figure 15:
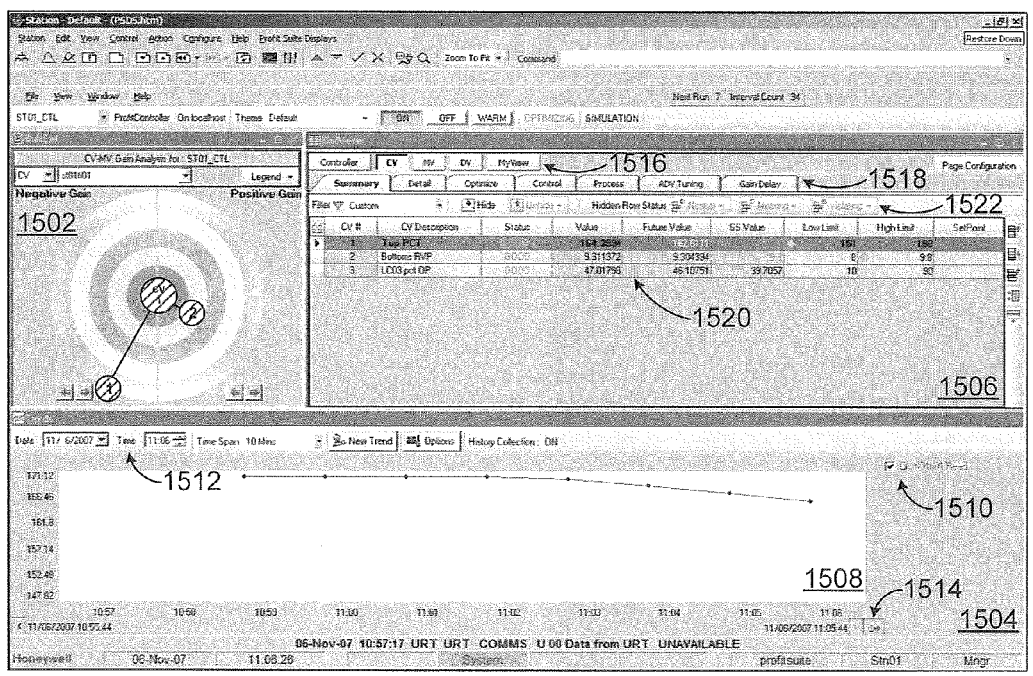
Figure 16:
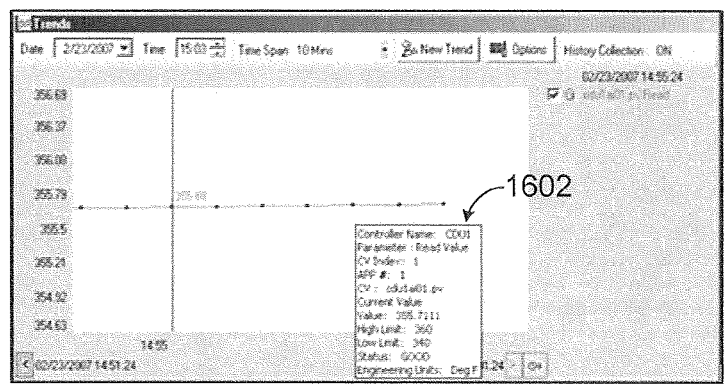

The "bull's eye" display shown in FIG. 12 can also be incorporated into other displays. For example, a display 1500 as shown in FIG. 15 may include a bull's eye display 1502, a trend display 1504, and a variable grid display 1506. The bull's eye display 1502 may be the same as or similar to the display 1200 shown in FIG. 12. The trend display 1504 includes a trend plot 1508, which is generally used to plot the values of one or more process variable parameters over time. The one or more process variable parameters are identified using controls 1510, which represent checkboxes here.

Additional controls 1512 can be used to select the time period for the trend plot 1508, such as the date and starting time of the trend plot 1508, as well as the width (time period) of the trend plot 1508. The controls 1512 can also be used to create a new trend plot 1508 or to access options of the trend plot 1508. In some embodiments, selection of the "Date" control 1512 can present the operator with a calendar (such as a calendar of the current month) and arrows for navigating forward or backward by month, and the operator can select a specific day in the displayed month. Also, selection of the "Time Span" control 1512 could allow the operator to select different predefined periods of time, such as ten minutes, twenty minutes, thirty minutes, forty five minutes, one hour, four hours, eight hours, and twenty four hours. In addition, if the operator places a cursor over a particular data point in the trend plot 1508, a pop-up window 1602 such as that shown in FIG. 16 could be provided to the operator. The pop-up window 1602 identifies various information associated with the process variable parameter's data point, such as its controller name, parameter (such as read, steady-state, or low or high limit), and process variable's name, actual value, limits, status, and engineering units.

Figure 17:
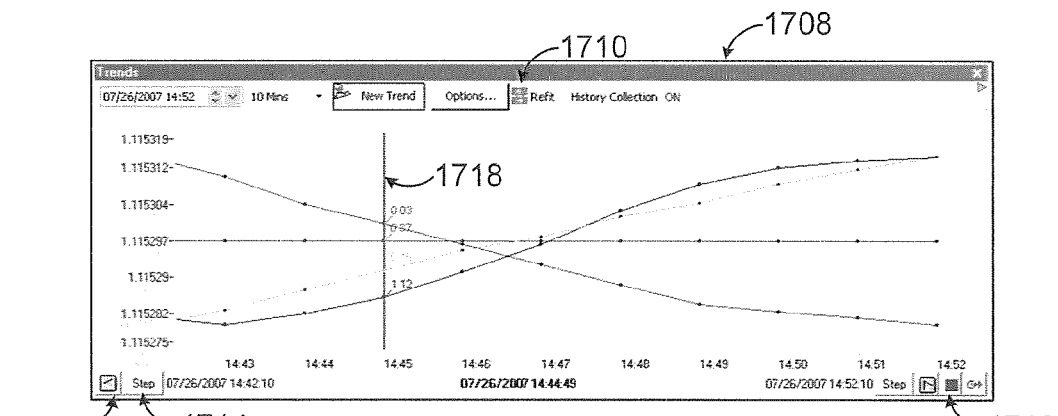

In the example shown in FIG. 15, the trend plot 1508 represents a single-scale plot, meaning a single scale is used along the vertical axis of the trend plot 1508. A multi-scale display, such as that shown in FIG. 17, could also be used. In FIG. 17, a trend plot 1708 plots process variable parameters that have different scales along the vertical axis of the trend plot 1708. One of the scales can be selected when an operator clicks on or selects one of the lines in the trend plot 1708. When this occurs, the scale for that particular process variable parameter is displayed along the vertical axis of the trend plot 1708. In some embodiments, the lines in the trend plot 1708 have different colors, and the displayed scale in the trend plot 1708 can have the same color as the selected line.

Figure 18:
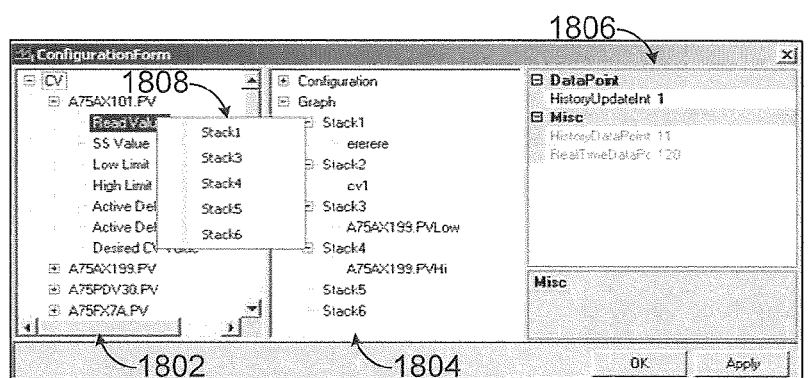

Process variable parameters can be added to the trend plots 1508 and 1708 in various ways (in addition to the use of the controls 1510). For example, a process variable can be "dragged and dropped" from the variable grid display 1506 into the trend plot 1508. When this occurs, a list of parameters associated with the process variable (such as read values, steady-state values, and low or high limit values) can be presented for selection by the operator. If one is selected, a line representing the selected process variable parameter could be displayed in the trend plot. A trend plot could also be configured using a configuration panel 1800 as shown in FIG. 18. The configuration panel 1800 could be accessed by the operator in any suitable manner, such as through the menu 204, toolbar 206, command line 208, the "Options" button in the controls 1510, or other mechanism.

In this example, the configuration panel 1800 includes a variable selection area 1802, an options selection area 1804, and an options definition area 1806. The variable selection area 1802 can be used to select specific process variable parameters, such as using a tree structure divided into CVs, MVs, and DVs to select a variable and one or more of it parameters. A selected process variable may have different parameter values that could be selected and plotted in the trend plot.

The options selection area 1804 allows the operator to select which options are displayed in the options definition area 1806 for configuration. In this example, the options selection area 1804 is divided into a general "Configuration" option and six individual "stack" options. The "stack" options generally represent the process variable parameters that are displayed in the trend plot 1508 or 1708. As shown in FIG. 18, a process variable parameter can be added to a stack by, among other things, right-clicking on a process variable parameter in the variable selection area 1802 and selecting a particular stack from a pop-up window 1808. This adds the process variable parameter to the stack list in the options selection area 1804. Similarly, a process variable parameter in the options selection area 1804 can be deleted from the options selection area 1804, such as by right-clicking on the process variable parameter and selecting a delete option in another pop-up window.

Figure 19:
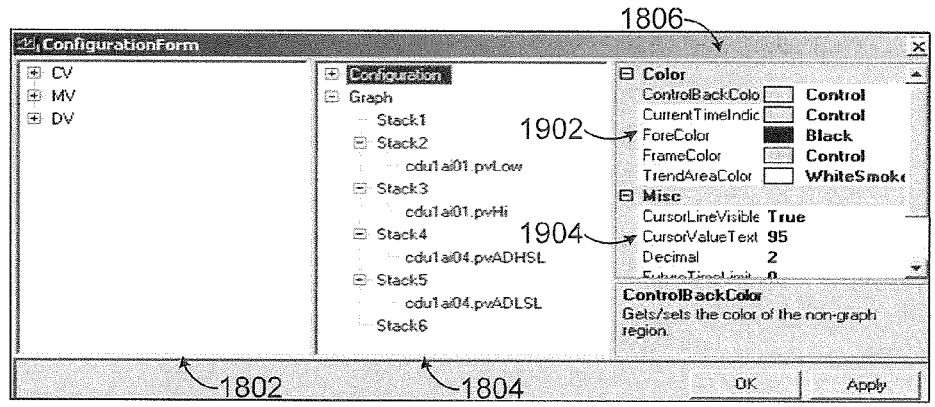

The options presented to the operator for configuration in the options definition area 1806 may vary depending on the selection made in the options selection area 1804. For example, as shown in FIG. 19, if the general "Configuration" option is selected in the options selection area 1804, color settings 1902 and miscellaneous settings 1904 are available for configuration by the operator. The color settings 1902 could be used to adjust various colors used in the trend plot 1508 or 1708. The miscellaneous settings 1904 could be used to control whether a cursor and data points are visible in the trend plot and to control a font size, a number of decimals (such as up to four), a future time limit, and a scaling mode in the trend plot.

Figure 20:
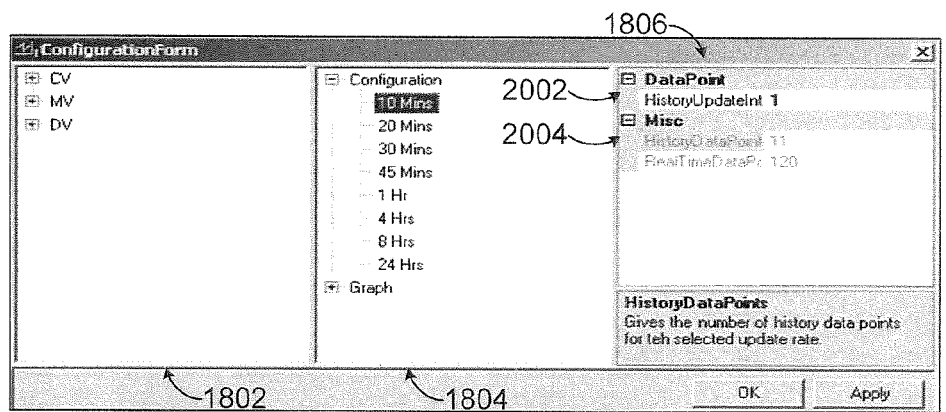

As shown in FIG. 20, under the "Configuration" option in the options selection area 1804 are multiple time spans, which can be selected to configure the trend plot 1508 or 1708 differently depending on the time span of the plot. In particular, data point settings 2002 and miscellaneous settings 2004 are available for configuration by the operator. The data point settings 2002 allow the operator to specify how often data points are updated using historical data in a given time period (such as every minute). The miscellaneous settings 2004 allow the operator to specify the number of historical data points and the number of real-time data points to include in the trend plot. Table 1 contains example default values for these settings 2002-2004 for different default time spans.

TABLE 1

| Time Span | History Update Interval (minutes) | Real-Time Update Interval (seconds) | Number of History Data Points |
|---|---|---|---|
| 10 min | 1 | 5 | 11 |
| 20 min | 2 | 5 | 11 |
| 30 min | 3 | 5 | 11 |
| 45 min | 4.5 | 5 | 11 |
| 1 hr | 6 | 5 | 11 |
| 4 hr | 24 | 5 | 11 |
| 8 hr | 48 | 5 | 11 |
| 24 hr | 144 | 5 | 11 |

Figure 21:
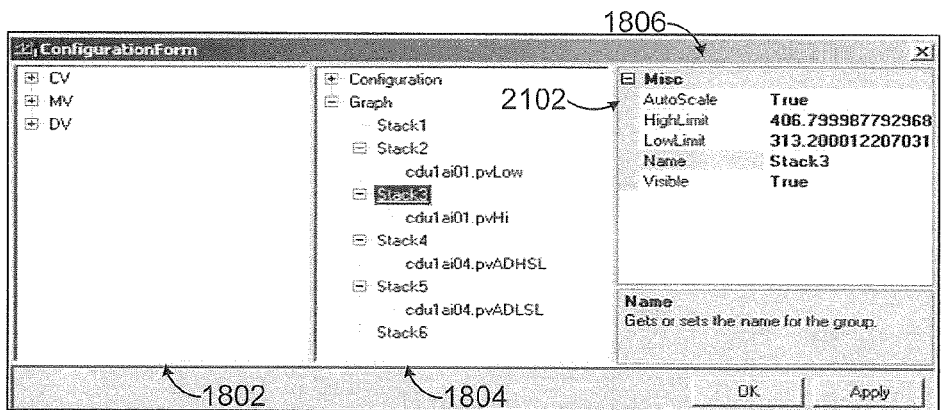

As shown in FIG. 21, if a particular stack is selected in the options selection area 1804, miscellaneous settings 2104 are available for configuration by the operator. For example, automatic scaling for the stack can be enabled to override the high and low limit settings (this could be set to false by default and is described in more detail below). The operator can also specify the trend plot's high and low limit values, name the particular stack, and indicate whether that particular stack's line is visible in the trend plot 1508 or 1708.

Figure 22:
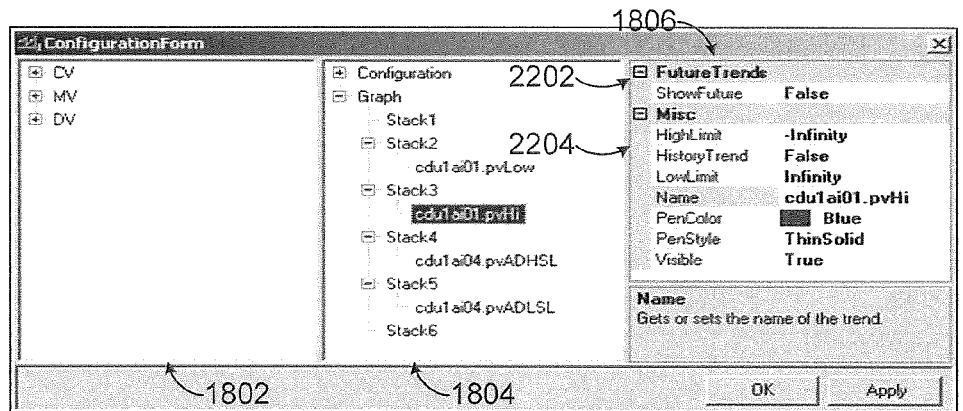

As shown in FIG. 22, if an individual process variable parameter is selected in one of the stacks in the options selection area 1804, future trend settings 2202 and miscellaneous settings 2204 are available for configuration by the operator. The future trend settings 2202 allow the operator to specify whether future or predicted trends can be displayed in the trend plot 1508 or 1708. The miscellaneous settings 2204 allow the operator to specify high and low limits for the particular stack, whether historical trends can be viewed for the particular stack, and the name of a tag shown in the trend plot. The miscellaneous settings 2204 also allow the operator to specify the color of the line in the trend plot, the style of the line (full, dashed, dotted, etc.) in the trend plot, and whether the line is visible in the trend plot.

Various other controls can be used in the trend display 1504 (and its associated displays) shown in FIGS. 15 through 22. For example, when a process variable parameter's values increase above its high limit or decrease below its low limit, the trend plot for that variable could be truncated. As shown in FIG. 17, a "Refit" button 1710 can be used to adjust the trend plot so that the complete trend for the process variable parameter is displayed. Also, the scaling mode for a process variable parameter could be set to auto-scale, and the visualization GUI 144 may automatically refit its curve in a trend plot. As another example, arrow buttons 1712 can be used to move back and forth in time in the trend plot 1508 or 1708, and step buttons 1714 can be used to jump farther back or farther ahead in time. A stop/play button 1716 can be used to freeze/unfreeze movement in the trend plot 1508 or 1708. In FIG. 17, the button 1716 has a stop symbol, although upon freezing (selection of the button 1716) the symbol on the button 1716 could change to a play symbol.

Further, one or more cursors 1718 can be used in a trend plot. Cursors 1718 could be placed on data points in the trend plot to read the parameter values at particular time instances. In some embodiments, a cursor could represent a hairline cursor (which moves along with the trend) or a static cursor (which does not move along with the trend). In particular embodiments, any number of static cursors could be used in the trend display, and one hairline cursor could be used in the trend display. One or all cursors could be removed by right-clicking a cursor and selecting the appropriate option in a drop-down list. In addition, zoom options could be used to zoom into and out of a trend plot. The zoom options could be accessible, for example, by right-clicking on the trend plot. A one-step zoom undo option can be used to undo the most recent zoom operation, and a full zoom undo option can be used to undo all zoom operations and return to a normal view of the trend plot.

Any other or additional functionality could be used with the trend display 1504. For example, a smart tag (similar to that described above) could be placed within the trend display 1504 and used to access a set of options. The options could include the ability to turn multi-scaling on and off in the trend plot 1508 or 1708 and the ability to view a legend for the displayed lines in the trend plot. The contents of the legend could be customized by the operator. The options could also include the ability to control whether fields and buttons are displayed in the trend display 1504 and whether values are displayed along cursors in the trend plot. Other functions supported by the trend display 1504 could include the exporting of data.

Returning to FIG. 15, the variable grid display 1506 can be used to present information regarding various process variables to an operator. In this example, the variable grid display 1506 includes a variable selector 1516, which allows the operator to select the set of process variables to be viewed. The variable grid display 1506 also includes a set of tabs 1518, which can be used to select the type of information displayed for the selected set of process variables. The variable grid display 1506 further includes a table 1520, which identifies the selected set of process variables and the selected information about the process variables. A set of filters 1522 can be used to hide and unhide variables in the table 1520 and to limit the variables displayed in the table 1520 based on certain criteria (such as whether the variables are nearing or exceeding their limits).

Figure 23:
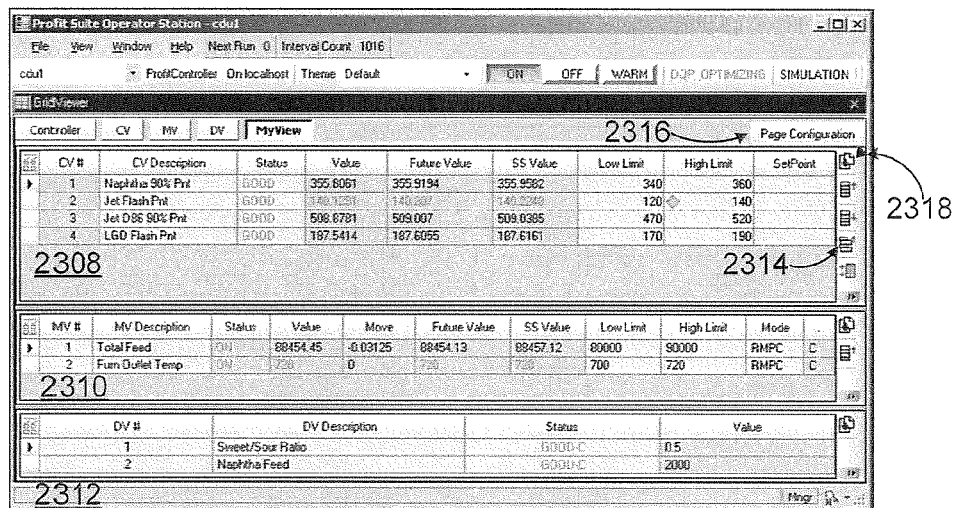
Figure 24:
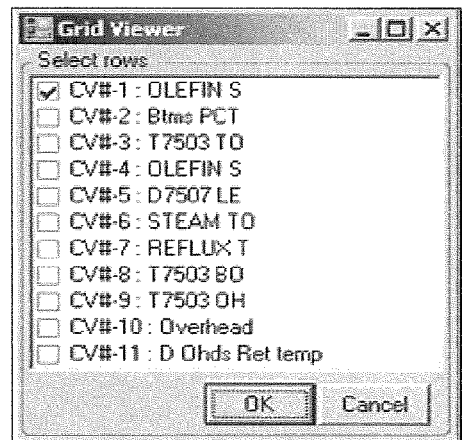

One of the options presented in the variable selector 1516 is a "My View" option. In this option, the operator is able to view a specific set of variables defined by the operator, which allows the operator to customize the process variables displayed in the variable grid display 1506. This may allow, for example, the operator to display multiple types of variables and information (such as descriptions, statuses, and operating values) in a single view. In that same view, the operator could set high and low limit values, set the control mode for controlled variables, and take any other suitable actions. An example of a "My View" display 2306 is shown in FIG. 23, which includes a controlled variable section 2308, a manipulated variable section 2310, and a disturbance variable section 2312. Each section includes one or more controls 2314, which can be used to add variables to a section and/or to re-arrange the order of variables in that section. Variables can be added to each section of the display 2306 in any suitable manner, such as by dragging and dropping variables into the sections or via the use of a selection window 2400 shown in FIG. 24. The selection window 2400 can be accessed in any suitable manner, such as through the controls 2314. The selection window 2400 allows the operator to check which variables are to be included in a particular section of the display 2306.

Figures 25, 26, 27:
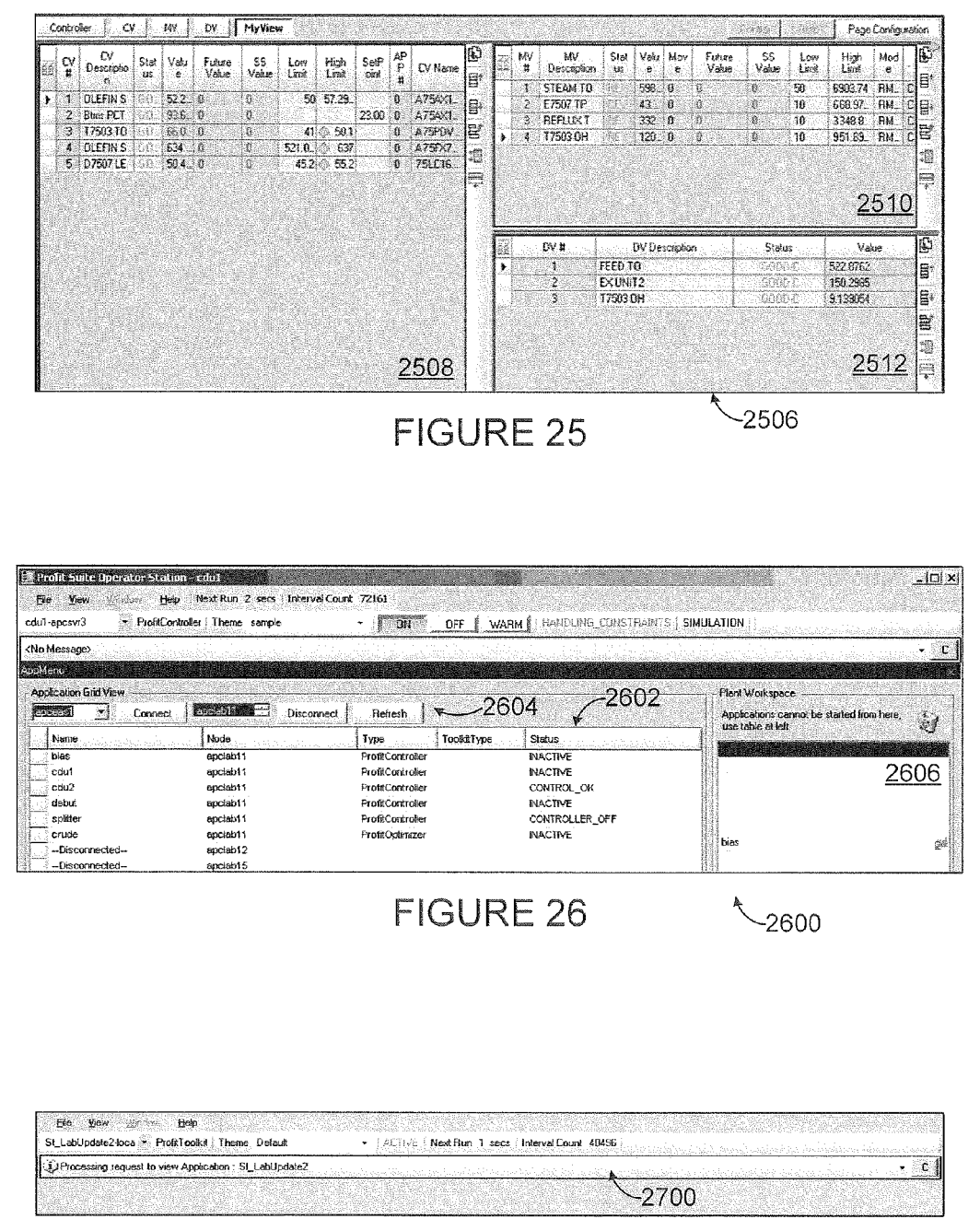

Various options associated with the display 2306 can be accessed and set using a configuration button 2316 or a smart tag 2318. Among other things, the options can include the ability to tile the "My View" display as shown in FIG. 25. Here, a display 2506 includes three sections 2508-2512 that have been tiled, with the controlled variable section 2508 on the left and the manipulated and disturbance sections 2508-2512 on the right. The operator could move or resize each of the sections 2508-2512, such as by dragging the edges of the sections 2508-2512 to the appropriate positions in the display 2506.

An additional display can be used by an operator to control the execution of applications (such as controller applications) on different components in the system 100. This includes controlling the execution of applications that are not executing on the operator's own operator station. In FIG. 26, a display 2600 represents an application menu that identifies various applications available for execution. For example, the display 2600 includes a table 2602 that identifies the names of applications, the components (nodes) on which the applications reside, and application statuses. The table 2602 also identifies the application type and toolkit type (if any), such as PROFIT CONTROLLER, PROFIT OPTIMIZER, or PROFIT TOOLKIT. Controls 2604 can be used by the operator to select and then connect to remote nodes in the system 100, at which point applications on the remote nodes can be controlled. For instance, a drop-down menu could provide a list of available nodes, and "Connect" and "Disconnect" buttons could be provided for connecting to and disconnecting from the selected node. Other controls 2604 could be used to select a particular application or to refresh the list of applications (both in the controls 2604 and in the table 2602).

A plant workspace 2606 in the display 2600 identifies a list of applications grouped in a customizable way by the operator, such as applications commonly viewed by the operator or applications divided by plant layout. When displayed in the plant workspace 2606, applications can be viewed without requiring the operator to first connect to the particular node(s) where the applications are located. In some embodiments, if an application is not running on its node, the operator may first be required to start the application using the table 2602 and/or controls 2604 before the application can be controlled using the plant workspace 2606.

In this embodiment, applications listed in the table 2602 can be selected by the operator, such as by double-clicking on one of the listed applications. Applications can also be selected using the controls 2604. If the selected application has not started, the operator may be given the option of invoking execution of the selected application. If the selected application has started (or the operator has invoked execution of the selected application), the operator may be given the option of viewing or terminating execution of the selected application. When an application is viewed, the "call page" for that application can be presented to the operator, such as is done above when a faceplate 350 is selected.

In any one of the displays presented above, the display could be modified to include a status message bar 2700 as shown in FIG. 27. In this example, the status message bar 2700 is displayed below a PROFIT SUITE OPERATOR STATION HEADER BAR from HONEYWELL INTERNATIONAL INC. The status message bar 2700 displays messages related to any changes in the visualization GUI 144 that are occurring at the time. The status message bar 2700 can also buffer a specified number of messages, such as the previous five messages, and these messages can be accessed via a drop-down menu. The messages can also be cleared from the drop-down menu using a clear or "C" button in the status message bar 2700. In this way, recent activity can be easily viewed and retrieved by the operator.

Although FIGS. 2 through 27 illustrate one example graphical user interface for visualization of control techniques in a process control system, various changes may be made to FIGS. 2 through 27. For example, the content, layout, and arrangement of each display shown in the figures are for illustration only. Each of these displays could include any suitable content in any suitable layout and arrangement. Also, various input mechanisms have been described above, such as the use of text boxes, drop-down menus or lists, right-click menus, and user devices (like a mouse). However, input can be received from an operator and output can be provided to an operator in any suitable manner. Further, various ones of these displays could be used apart from others of these displays, such as when the bull's eye displays are used separately. In addition, the above description represents a single specific implementation of the visualization GUI 144. This is for illustration and explanation only. Other embodiments of the visualization GUI 144 could be used without departing from the scope of this disclosure.

Figure 28:
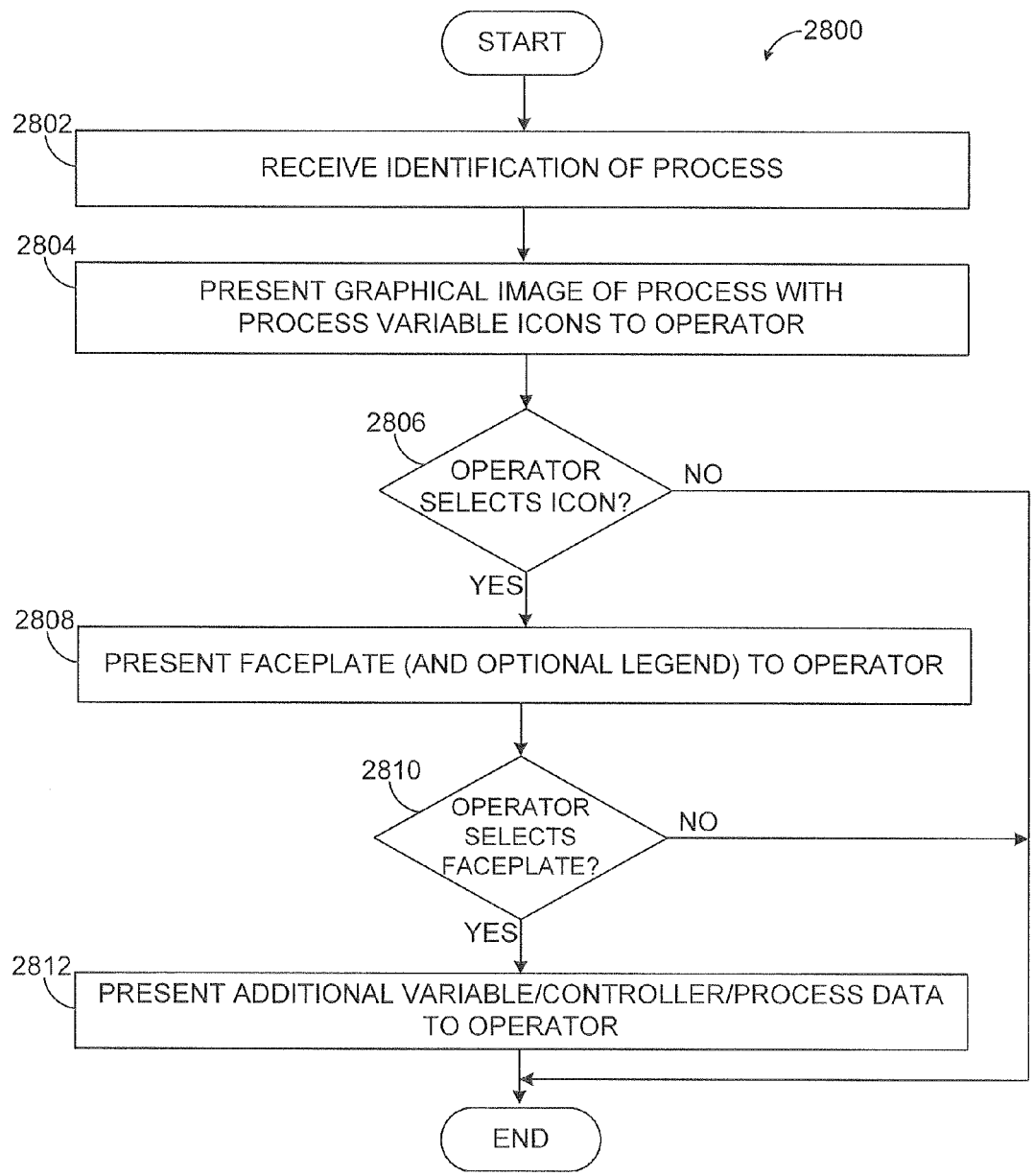
FIGS. 28 and 29 illustrate example methods for visualization of control techniques in a process control system according to this disclosure.
Figure 29:
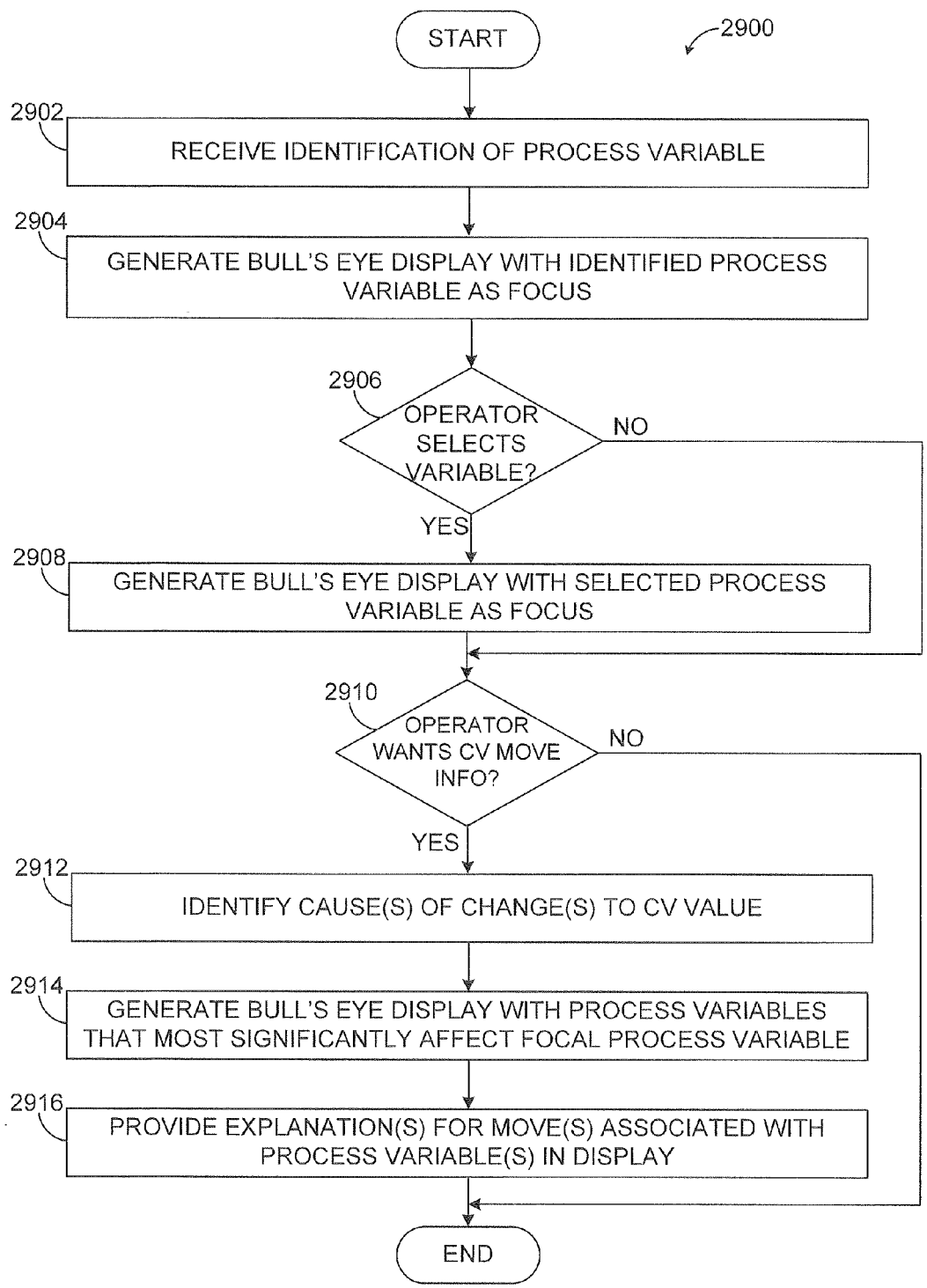

FIGS. 28 and 29 illustrate example methods for visualization of control techniques in a process control system according to this disclosure. The embodiments of the methods shown in FIGS. 28 and 29 are for illustration only. Other embodiments of the methods could be used without departing from the scope of this disclosure.

As shown in FIG. 28, a method 2800 includes receiving an identification of a process (or portion thereof) at step 2802. This may include, for example, an operator using the tabs 216 in the display 200 to select a portion of a larger process. This may also include the operator using the tabs 222 in the display 200 to select a particular subsection of the selected portion of the process. Any other or additional technique could be used to select a particular process or portion of a process.

A graphical image associated with the selected process or portion thereof is presented to the operator at step 2804. This may include, for example, presenting a graphical image 224 that represents the components in the selected process or portion thereof, such as the industrial equipment implementing the selected process or portion thereof. The graphical image 224 may include one or multiple icons 230*a*-230*f*, which are associated with one or multiple process variables in the selected process or portion thereof.

The operator could select one of the icons at step 2806. This may include, for example, the operator using a mouse or other input device to select a particular one of the icons 230*a*-230*f* in the graphical image 224. If the operator selects an icon, a process variable faceplate is presented to the operator at step 2808. This may include, for example, presenting a faceplate 350 to the operator, where the faceplate includes various information associated with the process variable represented by the selected icon. The information could include various aspects of the process variable and/or various aspects of a controller associated with the process variable. The contents of the faceplate may vary, among other things, based on the type of process variable represented by the selected icon.

The operator could select the faceplate at step 2810. This may include, for example, the operator using a mouse or other input device to select anywhere within the faceplate 350 or within a particular area of the faceplate 350. If the operator selects the faceplate, various additional displays could be presented to the operator at step 2812. The additional displays could include information associated with a controller, information associated with a process variable, or other process-related information. Among other things, the additional displays could include general or very detailed information about a process controller or process variable. Examples of the additional displays include the various displays shown in FIGS. 5-11 above.

As shown in FIG. 29, a method 2900 includes receiving an identification of a process variable associated with a process system at step 2902. This could include, for example, the operator using a mouse or other input device to select a particular process variable from a display. As a particular example, the process variable could be selected by the operator in any of the displays shown and described above.

A "bull's eye" display is generated at step 2904. This may include, for example, generating a display 1200 as shown in FIG. 12. The display 1200 could include the identified process variable as its focal variable symbol 1204. This may also include identifying up to a specified number of additional process variables associated with the identified focal process variable. The additional process variables could represent controlled, manipulated, and/or disturbance variables, depending on the type of the focal process variable and the particular process being controlled.

Any suitable operator actions may then occur using the bull's eye display. For example, the operator could select one of the additional process variables at step 2906. This may include, for example, the operator using a mouse or other input device to select a particular one of the additional process variables in the bull's eye display 1200. If the operator selects an additional process variable, another "bull's eye" display is generated at step 2908. This may include, for example, generating another display 1200, where the selected process variable is identified as the focus of the new display 1200.

The operator could also indicate whether one or more causes of movements in a controlled variable are to be identified at step 2910. If so, one or more causes of controlled variable movements are identified at step 2912, and a "bull's eye" display is generated at step 2914. This may include, for example, generating a display 1500 as shown in FIG. 15. The display 1500 could identify the process variables that are the most significant causes of the controlled variable movements. Also, explanations for one or more moves in the controlled variable values are presented to the operator at step 2916. This may include, for example, the operator selecting one of the process variables in the display 1500, and an explanation of how that particular process variable caused a controlled variable movement can be provided.

The cause(s) of a controlled variable movement can be determined at step 2912 in any suitable manner. For example, in some embodiments, a toolkit can be used to estimate the cause of a controlled variable movement in terms of one of the following categories: (1) not available, (2) CV is not moving, (3) an unpredicted effect (such as an unmeasured disturbance or significant model error), (4) a change in one or more DVs or MVs in feed-forward mode, (5) a change in one or more MVs that are in control, (6) the CV is being moved to resolve a hard limit error, (7) the CV is being moved to resolve a soft limit error, (8) the CV is being moved to reach optimum steady-state or honor soft limits, (9) the CV is moving because of decoupling effects, (10) the CV movement is not predicted for any independent variable (IV) changes, and (11) the CV movement is unrelated to any DV or MV changes (and could be noise). In particular embodiments, for reasons (6)-(9), the indices of the two manipulated variables with the most significant effect in the direction of CV movement can be listed in the display 1500.

In general, the toolkit can determine the change in each controlled variable from historical changes in the manipulated and disturbance variables. The changes in the controlled variable measurements can be determined, and the measured and predicted changes in each controlled variable can be filtered to reduce sensitivity to process noise before being compared. The toolkit can further determine an estimate of the noise deadband in the controlled variable predictions by applying a relatively heavy filter to the absolute value of the prediction error.

In particular embodiments, the dominant cause of movement in a controlled variable can be estimated using the following rules (in this order):

(1) If the main cause of a filtered measured CV change is not due to effects predicted from the MVs and DVs, the CV change is attributed to unmeasured disturbances or model error. In order to mitigate the effect of process noise, the unpredicted changes in the CV may need to exceed the predicted effects by one filtered noise deadband before the CV change is attributed to unmeasured disturbances or model error. The behavior of the state estimator may not be considered in this calculation.

(2) If the main cause of the filtered measured CV change is due to predicted effects and the main cause of the CV change is due to DVs and feed-forward MVs, the CV change is attributed to measured disturbances.

(3) If the main cause of the filtered measured CV change is due to MVs being controlled and the CV was violating either its high or low hard limit (one CV dead time ago), the CV change is attributed to MV control action.

(4) If the main cause of the filtered measured CV change is due to MVs being controlled and the CV was violating either its high or low soft limit (one CV dead time ago) and the application is not optimizing, the CV change is attributed to MV control action to honor the soft limits.

(5) If the main cause of the filtered measured CV change is due to MVs being controlled and the CV was violating either its high or low soft limit (one CV dead time ago) and the application is optimizing, the CV change is attributed to MV optimization moves.

(6) If the main cause of the filtered measured CV change is due to MVs being controlled and the CV was moving towards its steady-state optimum (one CV dead time ago) and the application is optimizing, the CV change is attributed to MV optimization moves.

(7) Otherwise, the CV change is attributed to MV decoupling moves.

In this example, the CV hard and soft limit errors are considered at one average CV dead time in the past. This is because the current moves in the CV may be due to MV moves made in the past as a function of the historical hard and soft limit errors. Also, a hard limit error may be calculated as the difference between a transformed hard limit and a predicted unforced CV value at the end of the control funnel. In addition, a soft limit error can be calculated as the difference between a transformed soft limit and a predicted unforced CV value at the end of the control funnel.

Table 2 outlines an example algorithm that could be used by the CV move cause estimation toolkit.

TABLE 2

| Step # | Description |
|---|---|
| 1 | When the toolkit is activated, initialize: build and initialize the internal toolkit data structures based on the number of CVs, MVs, DVs, and sub-models defined in the datapool; and read the CV prediction equations from the model file. |
| 2 | Normal execution pass: check the Read Model flag to determine if the model file has changed (if so, the model file information is read); check the Gain Delay Changed flag to read any updates to the model file information; predict the effect or each MV and DV on each CV; determine the two biggest changes for the MVs on control and the two biggest changes in the feed-forward variables (in the direction of the CV movement); calculate the filtered change in the measured CV value; calculate the filtered model bias; determine the historical hard limit error, soft limit error, and optimization slack (distance to steady-state optimum) and historize this information; and estimate the cause of CV movement from the above information. |

Table 3 provides a description of the toolkit inputs.

TABLE 3

| Input ([ ] denotes array) | Engineering Units | Description |
|---|---|---|
| NumberOfCVs | | Dimensioning variable for the other arrays |
| MoveFilter[ ] | Controller intervals | CV move filter intervals |
| Noiseband Filter[ ] | Controller intervals | CV noise band filter intervals |
| Noiseband[ ] | CV eng. Units | Filtered absolute CV prediction error. |
| CVMoveTKON (Datapool) | | Flag that defines if the TK function is required to execute. 1 = ON, 0 = OFF |
| CVMoveDVMove Index[1] (Datapool) | | The index of the independent variable (DV or feed-forward MV) that contributes the most effect to the current direction of CV movement. The index starts at MV 1 and increments for every MV or DV. |
| CVMoveDVMove Index[2] (Datapool) | | The index of the independent variable (DV or feed-forward MV) that contributes the second biggest effect to the current direction of CV movement. The index starts at MV 1 and increments for every MV or DV. |

In Table 3, the first five values could be provided by the user and may always be required.

Table 4 provides a description of the toolkit outputs.

TABLE 4

| Output ([ ] denotes array) | Description |
|---|---|
| Ret_Status | Message number of errors/warnings. Ret_Status is positive when the highest priority message is an error. Ret_Status is negative when the highest priority message is a warning. Ret_Status is zero when there are no warnings or errors. |
| RetStatus[ ] | Array of current function return statuses. |
| RetMessage[ ] | Array or current Error/Warning Messages. |
| RetFloat[ ] | Array of float arguments for error messages. For internal use only. |
| RetString[ ] | Array of string arguments for error messages. For internal use only. |
| CVMoveConfig (Datapool) | Is the CV Move Estimator configured? Set to 1.0 when the TK function is running. |

TABLE 4-continued

| Output ([ ] denotes array) | Description |
| --- | --- |
| CVMoveStatus (Datapool) | Is the CV Move Estimator running? Set to 1.0 when the TK function is running. |
| CVMoveCause[ ] (Datapool) | The enumeration for the cause of CV movement. |
| CVMoveMVMove Index[1] (Datapool) | The index of the MV which contributes the most effect to the current direction of CV movement. |
| CVMoveMVMove Index[2] (Datapool) | The index of the MV which contributes the second biggest effect to the current direction of CV movement. |

Table 5 provides a description of the toolkit's error and warning messages included in a return status value.

TABLE 5

| Status value | Description |
| --- | --- |
| 0 | No error occurred. Message cleared. |
| 1 | Bad float. The value of the named floating point parameter was read as bad from the datapool. |
| 2 | Visual Basic Exception. An untrapped error in the toolkit has occurred. The type of error and location are displayed. |
| 3 | Internal configuration error. Independent variable object has a zero index. |
| 4 | Internal configuration error. Dependent variable object has no sun-models defined. |
| 5 | Internal configuration error. Dependent variable object has a zero index. |
| 6 | Model filename read from datapool is invalid. |
| 7 | Invalid model file version. |
| 8 | Bad Number of CVs, MVs, or DVs in model file. |
| 9 | Error reading IJP array from model file. |
| 10 | Error reading dead time array from model file. |
| 11 | Error reading max dead time array from model file. |
| 12 | Error reading stable model array from model file. |
| 13 | Error reading gain array from model file. |
| 14 | Error reading parametric models from model file. |
| 15 | Number of sub-models in the datapool does not match number from model file. |
| 16 | The number of CVs defined in the toolkit does equal those defined in the datapool. |

Table 6 provides a description of the toolkit's output messages identifying a cause of CV movement.

TABLE 6

| Code value | Description |
| --- | --- |
| 1 | The CV is not moving at all. |
| 2 | An unpredicted effect (such as an unmeasured disturbance or significant model error). |
| 3 | A change in one or more of the DVs or MVs in feed-forward mode. |
| 4 | A change in one or more of the MVs that are in control. |
| 5 | The CV is being moved to resolve a hard limit error. |
| 6 | The CV is being moved to resolve a soft limit error. |
| 7 | The CV is being moved to reach the optimum steady-state or honor soft limits. |
| 8 | The CV is moving because of decoupling moves made by the MVs. |
| 9 | The CV movement is unrelated to any DV or MV changes (such as noise). |
| 10 | Unknown cause. |
| 1000+ | Internal error indication. |

Although FIGS. 28 and 29 illustrate examples of methods for visualization of control techniques in a process control system, various changes may be made to FIGS. 28 and 29. For example, FIGS. 28 and 29 illustrate examples of how the display 200 in FIG. 2 and the display 1200 in FIG. 12 could be used. These displays could be used in any other suitable manner. Also, while shown as a series of steps, the steps in each of the methods could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
presenting a graphical display to an operator, the graphical display comprising (i) a first image associated with a selected portion of a process, (ii) a second image associated with a selected subsection of the selected portion of the process, and (iii) multiple icons located within or over the second image, each icon identifying a corresponding one of multiple process variables associated with the selected subsection of the process;
receiving a selection of one of the icons from the operator; and
presenting a faceplate to the operator, the faceplate located within a window presented over the graphical display, the faceplate comprising (i) information associated with the process variable identified by the selected icon and (ii) information related to a controller associated with the process variable identified by the selected icon;

wherein the icons represent different types of process variables including a controlled variable type, a manipulated variable type, and a disturbance variable type, a shape of each icon based on the type of process variable identified by the icon, an indicator of each icon based on a status of the process variable identified by the icon; and wherein a type of content presented in the faceplate varies depending on whether the process variable identified by the selected icon is of the controlled variable type, the manipulated variable type, or the disturbance variable type.

2. The method of claim 1, wherein the indicator of each icon comprises:
a first indicator that indicates whether the associated process variable is available for use by the controller, not available for use by the controller, or not controllable by the controller;
a second indicator that indicates whether the associated process variable is approaching or violating a limit; and
if the associated process variable is a controlled variable, a third indicator that indicates whether the controlled variable is wound up.

3. The method of claim 1, further comprising:
presenting a legend to the operator, the legend identifying meanings of the icon shapes and the icon indicators.

4. The method of claim 1, further comprising:
receiving a selection of at least a portion of the faceplate from the operator; and
presenting at least one additional display to the operator.

5. The method of claim 4, wherein the at least one additional display comprises one or more of:
a display comprising information about at least one of the process variables; and
a display comprising information about the controller, the controller used to control at least one aspect of the process.

6. The method of claim 5, further comprising:
receiving an adjustment to at least one value associated with one or more of the process variables using the faceplate and the at least one additional display.

7. The method of claim 1, wherein presenting the faceplate comprises presenting a faceplate summary to the operator, the faceplate summary comprising a plurality of faceplates associated with a corresponding plurality of process variables.

8. The method of claim 7, further comprising:
receiving information defining a configuration of the faceplate summary.

9. The method of claim 1, wherein:
the faceplate is associated with a group of process variables; and
presenting the faceplate comprises presenting a group faceplate and individual process variable displays to the operator.

10. The method of claim 1, further comprising:
receiving a selection of multiple icons from the operator; and
presenting a summary or report for multiple process variables that are associated with the selected icons.

11. The method of claim 1, wherein:
when the process variable identified by the selected icon is of the controlled variable type, the faceplate comprises (i) a name, status, and mode of the controller, (ii) an identification of a number of manipulated variables used by the controller to control the associated process variable, (iii) a name and status of the associated process variable, (iv) limits for the associated process variable, (v) an indicator identifying whether any of the limits are being violated, and (vi) graphs charting a last actual value, a future or predicted value, and a steady-state value of the associated process variable against the limits;
when the process variable identified by the selected icon is of the manipulated variable type, the faceplate comprises (i) the name, status, and mode of the controller, (ii) the name and status of the associated process variable, (iii) the limits for the associated process variable, and (iv) the graphs charting the last actual value, the future or predicted value, and the steady-state value of the associated process variable against the limits; and
when the process variable identified by the selected icon is of the disturbance variable type, the faceplate comprises (i) the name, status, and mode of the controller, (ii) the name and status of the associated process variable, and (iii) the last actual value of the associated process variable.

12. The method of claim 1, further comprising:
presenting a second graphical display to the operator, the second graphical display comprising (i) a focal variable symbol identifying a focal process variable and (ii) one or more additional variable symbols identifying one or more additional process variables associated with the focal process variable;
wherein each of the one or more additional process variables is associated with a gain;
wherein each additional variable symbol is positioned in the second graphical display based on the gain associated with the additional process variable identified by that additional variable symbol, one portion of the graphical display associated with negative gains and another portion of the graphical display associated with positive gains; and
wherein a distance of each additional variable symbol from the focal variable symbol is proportional to the gain between the additional process variable identified by that additional variable symbol and the focal process variable.

13. An apparatus comprising:
at least one memory configured to store information associated with a plurality of process variables, the process variables associated with a process; and
at least one processor configured to:
present a graphical display comprising (i) a first image associated with a selected portion of the process, (ii) a second image associated with a selected subsection of the selected portion of the process, and (iii) multiple icons located within or over the second image, each icon identifying a corresponding one of the process variables associated with the selected subsection of the process;
receive a selection of one of the icons; and
present a faceplate within a window over the graphical display, the faceplate comprising (i) information associated with the process variable identified by the selected icon and (ii) information related to a controller associated with the process variable identified by the selected icon;
wherein the icons represent different types of process variables including a controlled variable type, a manipulated variable type, and a disturbance variable type, a shape of each icon based on the type of process variable identified by the icon, an indicator of each icon based on a status of the process variable identified by the icon; and wherein a type of content presented in the faceplate varies depending on whether the process variable identified by the selected icon is of the controlled variable type, the manipulated variable type, or the disturbance variable type.

14. The apparatus of claim 13, wherein the indicator of each icon comprises:
   a first indicator that indicates whether the associated process variable is available for use by the controller, not available for use by the controller, or not controllable by the controller;
   a second indicator that indicates whether the associated process variable is approaching or violating a limit; and
   if the associated process variable is a controlled variable, a third indicator that indicates whether the controlled variable is wound up.

15. The apparatus of claim 13, wherein the at least one processor is further configured to present a legend identifying meanings of the icon shapes and the icon indicators.

16. The apparatus of claim 13, wherein the at least one processor is further configured to:
   receive a selection of at least a portion of the faceplate; and
   present at least one additional display associated with at least the selected portion of the faceplate.

17. The apparatus of claim 16, wherein the at least one additional display comprises one or more of:
   a display comprising information about at least one of the process variables; and
   a display comprising information about the controller.

18. The apparatus of claim 13, wherein the at least one processor is configured to present the faceplate by presenting a faceplate summary, the faceplate summary comprising a plurality of faceplates associated with a corresponding plurality of process variables.

19. The apparatus of claim 13, wherein:
   the faceplate is associated with a group of process variables; and
   the at least one processor is configured to present the faceplate by presenting a group faceplate and individual process variable displays.

20. A computer readable medium embodying a computer program, the computer program comprising computer readable program code for:
   presenting a graphical display comprising (i) a first image associated with a selected a portion of a process, (ii) a second image associated with a selected subsection of the selected portion of the process, and (iii) multiple icons located within or over the second image, each icon identifying a corresponding one of multiple process variables associated with the selected subsection of the process;
   receiving a selection of one of the icons; and
   presenting a faceplate within a window over the graphical display, the faceplate comprising (i) information associated with the process variable identified by the selected icon and (ii) information related to a controller associated with the process variable identified by the selected icon;
   wherein the icons represent different types of process variables including a controlled variable type, a manipulated variable type, and a disturbance variable type, a shape of each icon based on the type of process variable identified by the icon, an indicator of each icon based on a status of the process variable identified by the icon; and
   wherein a type of content presented in the faceplate varies depending on whether the process variable identified by the selected icon is of the controlled variable type, the manipulated variable type, or the disturbance variable type.

21. The computer readable medium of claim 20, wherein:
   a first indicator that indicates whether the associated process variable is available for use by the controller, not available for use by the controller, or not controllable by the controller;
   a second indicator that indicates whether the associated process variable is approaching or violating a limit; and
   if the associated process variable is a controlled variable, a third indicator that indicates whether the controlled variable is wound up.

22. The computer readable medium of claim 20, further comprising computer readable program code for:
   receiving a selection of at least a portion of the faceplate; and
   presenting at least one additional display associated with at least the selected portion of the faceplate, wherein the at least one additional display comprises one or more of:
   a display comprising information about at least one of the process variables; and
   a display comprising information about the controller.

* * * * *